US011761120B2

(12) United States Patent
Lief et al.

(10) Patent No.: US 11,761,120 B2
(45) Date of Patent: Sep. 19, 2023

(54) HIGH MELT FLOW POLYPROPYLENE HOMOPOLYMERS FOR FIBER APPLICATIONS

(71) Applicant: Chevron Phillips Chemical Company LP, The Woodlands, TX (US)

(72) Inventors: Graham R. Lief, Bartlesville, OK (US); Eric J. Haschke, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 389 days.

(21) Appl. No.: 17/067,922

(22) Filed: Oct. 12, 2020

(65) Prior Publication Data

US 2021/0032779 A1 Feb. 4, 2021

Related U.S. Application Data

(62) Division of application No. 14/993,209, filed on Jan. 12, 2016, now Pat. No. 10,883,197.

(51) Int. Cl.
*C08F 4/6592* (2006.01)
*C08F 110/06* (2006.01)
*D01F 6/06* (2006.01)
*B29C 48/05* (2019.01)
*B29K 23/00* (2006.01)
*B29L 31/00* (2006.01)
*C08F 4/659* (2006.01)

(52) U.S. Cl.
CPC ............. *D01F 6/06* (2013.01); *B29C 48/05* (2019.02); *C08F 110/06* (2013.01); *B29K 2023/10* (2013.01); *B29L 2031/731* (2013.01); *C08F 4/65912* (2013.01); *C08F 4/65916* (2013.01)

(58) Field of Classification Search
CPC . C08F 4/65927; C08F 4/65916; C08F 110/06
See application file for complete search history.

(56) References Cited

U.S. PATENT DOCUMENTS

| | | | |
|---|---|---|---|
| 3,242,099 A | 3/1966 | Manyik |
| 3,248,179 A | 4/1966 | Norwood |
| 4,501,885 A | 2/1985 | Sherk |
| 4,588,790 A | 5/1986 | Jenkins, III |
| 4,794,096 A | 12/1988 | Ewen |
| 4,808,561 A | 2/1989 | Welborn, Jr. |
| 5,134,208 A | 7/1992 | Burstain |
| 5,243,001 A | 9/1993 | Winter |
| 5,352,749 A | 10/1994 | Dechellis |
| 5,436,304 A | 7/1995 | Griffin |
| 5,565,175 A | 10/1996 | Hottovy |
| 5,575,979 A | 11/1996 | Hanson |
| 5,576,259 A | 11/1996 | Hasegawa |
| 5,770,753 A | 6/1998 | Kueber |
| 5,807,938 A | 9/1998 | Kaneko |
| 5,919,983 A | 7/1999 | Rosen |
| 6,107,230 A | 8/2000 | McDaniel |
| 6,165,929 A | 12/2000 | McDaniel |
| 6,239,235 B1 | 5/2001 | Hottovy |
| 6,262,191 B1 | 7/2001 | Hottovy |
| 6,294,494 B1 | 9/2001 | McDaniel |
| 6,300,271 B1 | 10/2001 | McDaniel |
| 6,316,553 B1 | 11/2001 | McDaniel |
| 6,355,594 B1 | 3/2002 | McDaniel |
| 6,376,415 B1 | 4/2002 | McDaniel |
| 6,388,017 B1 | 5/2002 | McDaniel |
| 6,391,816 B1 | 5/2002 | McDaniel |
| 6,395,666 B1 | 5/2002 | McDaniel |
| 6,524,987 B1 | 2/2003 | Collins |
| 6,548,441 B1 | 4/2003 | McDaniel |
| 6,548,442 B1 | 4/2003 | McDaniel |
| 6,576,583 B1 | 6/2003 | McDaniel |
| 6,613,712 B1 | 9/2003 | McDaniel |
| 6,632,894 B1 | 10/2003 | McDaniel |
| 6,657,025 B2 | 12/2003 | Blackmon |
| 6,667,274 B1 | 12/2003 | Hawley |
| 6,750,302 B1 | 6/2004 | McDaniel |
| 6,833,415 B2 | 12/2004 | Kendrick |
| 7,022,797 B2 | 4/2006 | Blackmon |
| 7,122,606 B2 | 10/2006 | Tonti |
| 7,294,599 B2 | 11/2007 | Jensen |
| 7,531,606 B2 | 5/2009 | Hendrickson |
| 7,598,327 B2 | 10/2009 | Shaw |
| 7,601,665 B2 | 10/2009 | McDaniel |
| 7,884,163 B2 | 2/2011 | McDaniel |
| 8,114,946 B2 | 2/2012 | Yang |
| 8,309,485 B2 | 11/2012 | Yang |
| 8,609,793 B2 | 12/2013 | Buck |
| 8,623,973 B1 | 1/2014 | McDaniel |
| 8,822,608 B1 | 9/2014 | Bhandarkar |
| 9,023,959 B2 | 5/2015 | McDaniel |
| 2003/0149199 A1 | 8/2003 | Schottek |
| 2003/0216527 A1 | 11/2003 | Sugano |
| 2008/0214767 A1 | 9/2008 | Mehta |
| 2009/0017710 A1 | 1/2009 | Bugada |
| 2009/0264607 A1 | 10/2009 | Terreur |
| 2010/0016510 A1 | 1/2010 | Malm |
| 2010/0069560 A1 | 3/2010 | Masarati |
| 2011/0054110 A1 | 3/2011 | Ter Woort |

(Continued)

FOREIGN PATENT DOCUMENTS

| | | |
|---|---|---|
| CN | 1546537 A | 11/2004 |
| WO | 2000012605 A1 | 3/2000 |
| WO | 2006019494 A1 | 2/2006 |
| WO | 2014204778 A1 | 12/2014 |

OTHER PUBLICATIONS

Achieve Resin, Exxon Mobil Chemical (www.exxonmobilchemical.com), 2015, 1 pg.
International Search Report and Written Opinion issued in corresponding application No. PCT/US2017/012511 dated Jul. 3, 2017, 12 pgs.

(Continued)

*Primary Examiner* — Caixia Lu
(74) *Attorney, Agent, or Firm* — Merchant & Gould P.C.

(57) ABSTRACT

Disclosed herein are high melt flow polypropylene homopolymers generally characterized by a melt flow rate ranging from 200 g/10 min to 3000 g/10 min, a ratio of Mw/Mn ranging from 2 to 5, and a peak melting point ranging from 138° C. to 151° C. These polypropylene homopolymers can be produced by catalyst systems containing a racemic ansa-bis(indenyl)zirconocene compound, an activator-support, and an organoaluminum co-catalyst.

19 Claims, 4 Drawing Sheets

(56) References Cited

U.S. PATENT DOCUMENTS

2015/0119537 A1  4/2015  Holtcamp
2016/0082690 A1  3/2016  Gallez

OTHER PUBLICATIONS

Metocene MF650X—Metallocene PP Homopolymer, LyondellBasell Industries Holdings, B.V. (https://polymers.yondellbasell.com), 2015, 2 pgs.

HIGH MELT FLOW POLYPROPYLENE HOMOPOLYMERS FOR FIBER APPLICATIONS

This application is a divisional application of U.S. patent application Ser. No. 14/993,209, filed on Jan. 12, 2016, now U.S. Pat. No. 10,883,197, the disclosure of which is incorporated herein by reference in its entirety.

FIELD OF THE INVENTION

The present disclosure concerns catalyst systems containing a bridged bis(indenyl) metallocene compound and an activator-support, and more particularly relates to the use of such catalyst systems to produce high melt flow polypropylene homopolymers.

BACKGROUND OF THE INVENTION

Polyolefins such as polypropylene homopolymers can be produced using various combinations of catalyst systems and polymerization processes. However, the production of high melt flow polypropylene homopolymers often requires the use of vis-breaking techniques and peroxide additives to reduce the viscosity and to increase the melt flow rate. It would be beneficial to produce the high melt flow rate polypropylene homopolymers without the need for the vis-breaking techniques and peroxide additives. Moreover, it would be beneficial to produce these high melt flow rate polypropylene homopolymers with molecular weight and melting point characteristics that make them particularly suitable for use in fiber and related end-use applications. Accordingly, it is to these ends that the present disclosure is directed.

SUMMARY OF THE INVENTION

The present invention generally relates to polypropylene homopolymers characterized by a melt flow rate in a range from about 200 g/10 min to about 3000 g/10 min, a ratio of Mw/Mn in a range from about 2 to about 5, and a peak melting point in a range from about 138° C. to about 151° C. In some embodiments, the polypropylene homopolymer can have a melt flow rate in a range from about 200 g/10 min to about 3000 g/10 min, a ratio of Mw/Mn in a range from about 2 to about 5, and a ratio of Mz/Mw in a range from about 1.7 to about 3.5. Beneficially, these polypropylene homopolymers can be produced in a single reactor, and without the need for a vis-breaking step and related peroxide additives. These polypropylene homopolymers can be used to produce various articles of manufacture, such as molded products, nonwoven articles, and fibers or fabrics.

Catalyst compositions and polymerization processes used to produce the polypropylene homopolymers also are disclosed herein. For instance, a catalyst composition of this invention can comprise a racemic ansa-bis(indenyl)zirconocene compound, an activator-support, and an optional co-catalyst. An illustrative polymerization process can comprise contacting the catalyst composition (i.e., any catalyst composition disclosed herein) with propylene in a polymerization reactor system under polymerization conditions to produce the polypropylene homopolymer.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

DEFINITIONS

Figure 1:
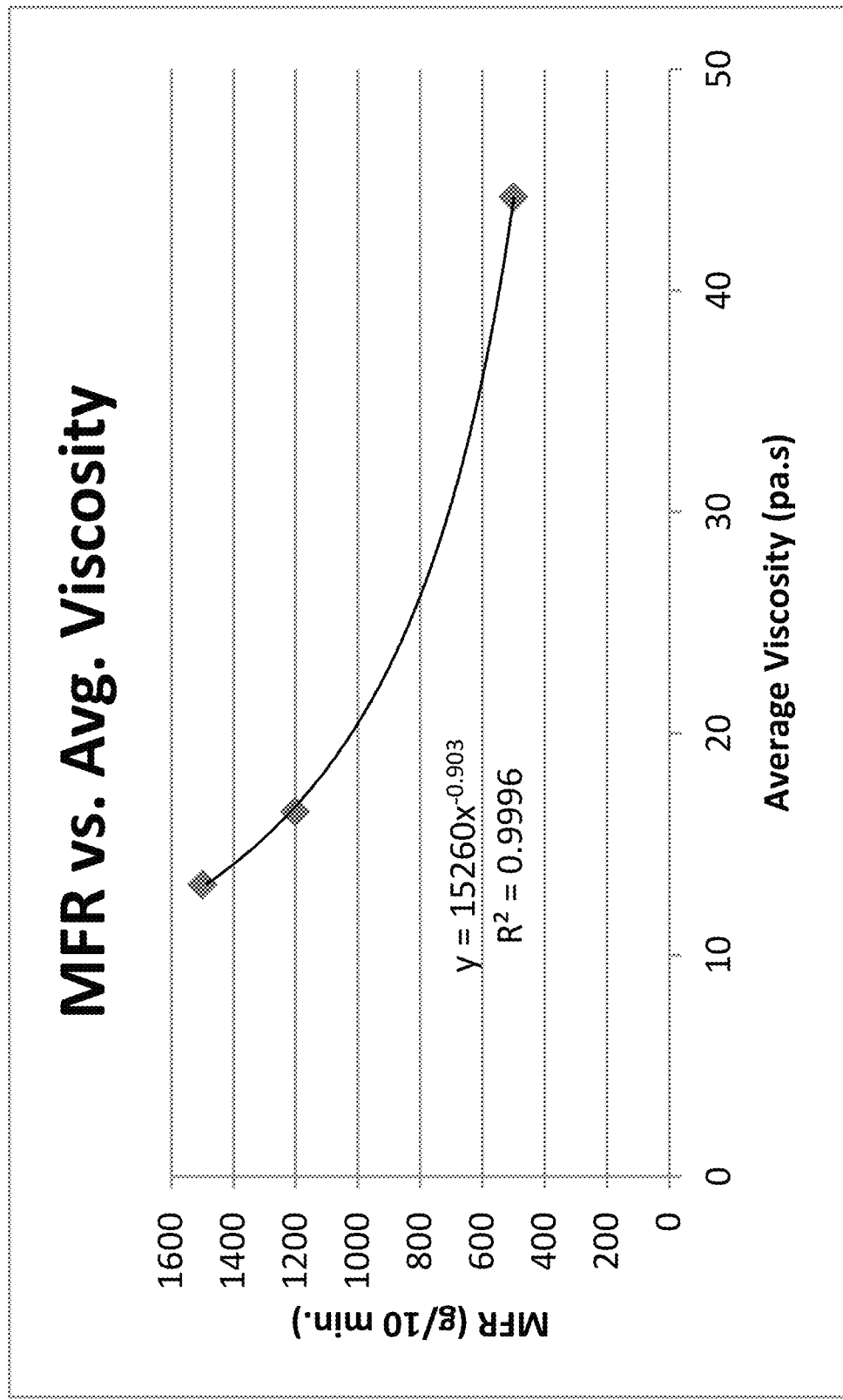
FIG. 1 presents a plot of a calibration curve for the determination of the polypropylene melt flow rate based on the viscosity at 230° C. in Pa-sec.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise. For example, a catalyst composition consistent with the present invention can comprise; alternatively, can consist essentially of; or alternatively, can consist of; a metallocene compound, an activator-support, and optionally, a co-catalyst.

The terms "a," "an," and "the" are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the structure or name presented is intended to encompass all structural isomers, conformational isomers, and stereoisomers that can arise from a particular set of substituents, unless stated otherwise. Also, unless stated otherwise, the structure or name also encompasses all enantiomers, diastereomers, and other optical isomers whether in enantiomeric or racemic forms, as well as mixtures of stereoisomers, as would be recognized by a skilled artisan. Thus, unless indicated otherwise, a general reference to pentane includes n-pentane, 2-methyl-butane, and 2,2-dimethylpropane, while a general reference to a butyl group includes an n-butyl group, a sec-butyl group, an iso-butyl group, and a tert-butyl group.

The term "substituted" when used to describe a group, for example, when referring to a substituted analog of a particular group, is intended to describe any non-hydrogen moiety that formally replaces a hydrogen atom in that group, and is intended to be non-limiting. A group or groups can also be referred to herein as "unsubstituted" or by equivalent terms such as "non-substituted," which refers to the original group in which a non-hydrogen moiety does not replace a hydrogen atom within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Thus, a propylene polymer would include polypropylene homopolymers, propylene-based copolymers, propylene-based terpolymers, and the like. Similarly, the scope of the term "polymerization" includes homopolymerization, copolymerization, and terpolymerization. The term "polymer" also includes all possible geometrical configurations, unless stated otherwise, and such configurations may include isotactic, syndiotactic, and random symmetries.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The term "activator-support" is used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the activator-support can comprise a calcined contact product of at least one solid oxide with at least one electron-withdrawing anion source compound. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound, or the activator-support, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The term "contact product" is used herein to describe methods and compositions wherein the components are combined or contacted together in any order, in any manner, and for any length of time, unless otherwise specified. For example, the components can be contacted by blending or mixing. Further, unless otherwise specified, the contacting of any component can occur in the presence or absence of any other component of the methods and compositions described herein. Combining additional materials or components can be done by any suitable method. This term encompass mixtures, blends, solutions, slurries, reaction products, and the like, as well as combinations thereof. Similarly, the term "contacting" is used herein to refer to materials which can be blended, mixed, slurried, dissolved, reacted, treated, or otherwise contacted in some other manner.

The terms Mn, Mw, and Mz, as used herein, are defined as follows: Mn: number-average molecular weight; Mw: weight-average molecular weight; and Mz: z-average molecular weight. These values are determined by calculations on the basis of molecular weight distribution curves determined using gel permeation chromatography (GPC), also known as size-exclusion chromatography (SEC). Unless otherwise specified herein, the terms "MWD" and "molecular weight distribution" refer to the ratio of Mw/Mn.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of a polypropylene homopolymer consistent with embodiments of this invention. By a disclosure that the ratio of Mw/Mn can be in a range from about 2 to about 5, the intent is to recite that the ratio of Mw/Mn can be any ratio in the range and, for example, can be equal to about 2, about 2.5, about 3, about 3.5, about 4, about 4.5, or about 5. Additionally, the ratio of Mw/Mn can be within any range from about 2 to about 5 (for example, from about 2.2 to about 4.5), and this also includes any combination of ranges between about 2 and about 5 (for example, the Mw/Mn ratio can be in a range from about 2 to about 3, or from about 3.5 to about 5). Likewise, all other ranges disclosed herein should be interpreted in a manner similar to these examples.

DETAILED DESCRIPTION OF THE INVENTION

The present invention is directed generally to metallocene-based catalyst systems, methods for preparing the catalyst systems, methods for using the catalyst systems to polymerize propylene, the propylene homopolymer resins produced using such catalyst systems and polymerization processes, and fabricated articles produced using these propylene homopolymer resins.

Polypropylene Homopolymers

Generally, the polymers disclosed herein are polypropylene hompopolymers having unexpected and beneficial combinations of melt flow rate, peak melting point, Mw/Mn ratio, and Mz/Mw ratio, and can be produced without the need for vis-breaking processes or the use of peroxide additives (and their detrimental decomposition products). An illustrative and non-limiting example of a polypropylene homopolymer of the present invention can have a melt flow rate in a range from about 200 g/10 min to about 3000 g/10 min, a ratio of Mw/Mn in a range from about 2 to about 5, and a peak melting point in a range from about 138° C. to about 151° C. Another illustrative and non-limiting example of a polypropylene homopolymer of the present invention can have a melt flow rate in a range from about 200 g/10 min to about 3000 g/10 min, a ratio of Mw/Mn in a range from about 2 to about 5, and a ratio of Mz/Mw in a range from about 1.7 to about 3.5. These illustrative and non-limiting examples of polypropylene homopolymers consistent with the present invention also can have any of the polymer properties listed below and in any combination.

The peak melting points of polypropylene homopolymers disclosed herein often can range from about 138° C. to about 152° C., for example, from about 138° C. to about 151° C., or from about 138° C. to about 150° C. In particular embodiments, the peak melting point of the polypropylene homopolymer can be in a range from about 140° C. to about 152° C., from about 140° C. to about 151° C., from about 140° C. to about 150° C., from about 141° C. to about 151° C., or from about 141° C. to about 149° C.

Consistent with certain embodiments of this invention, polypropylene homopolymers described herein can have a very high melt flow rate (MFR, 230° C.), often in a range from about 200 g/10 min to about 3000 g/10 min, from about 300 g/10 min to about 3000 g/10 min, from about 300 g/10 min to about 2500 g/10 min, or from about 300 g/10 min to about 2000 g/10 min. In further embodiments, polypropylene homopolymers described herein can have a MFR in a range from about 350 g/10 min to about 2500 g/10 min, from about 350 g/10 min to about 2000 g/10 min, from about 500 g/10 min to about 2500 g/10 min, or from about 500 g/10 min to about 2000 g/10 min.

In an embodiment, propylene homopolymers described herein can have a ratio of Mw/Mn, or the polydispersity index, in a range from about 2 to about 5, from about 2.2 to about 5, from about 2 to about 4.5, or from about 2.2 to about 4.5. In another embodiment, propylene homopolymers described herein can have a Mw/Mn in a range from about 2.4 to about 5, from about 2.4 to about 4.5, or from about 2.5 to about 4.5.

In an embodiment, propylene homopolymers described herein can have a ratio of Mz/Mw in a range from about 1.7 to about 3.5, from about 1.7 to about 3, from about 1.8 to about 3.5, or from about 1.8 to about 3. In another embodiment, propylene homopolymers described herein can have a Mz/Mw in a range from about 1.9 to about 3.3, from about 1.9 to about 3, or from about 1.9 to about 2.8.

In an embodiment, propylene homopolymers described herein can have a weight-average molecular weight (Mw) in a range from about 40,000 g/mol to about 110,000 g/mol, from about 40,000 g/mol to about 90,000 g/mol, from about 45,000 g/mol to about 110,000 g/mol, or from about 45,000 g/mol to about 85,000 g/mol. Additionally or alternatively, the propylene homopolymers described herein can have a number-average molecular weight (Mn) in a range from about 10,000 g/mol to about 40,000 g/mol, from about 10,000 g/mol to about 30,000 g/mol, from about 12,000 g/mol to about 35,000 g/mol, or from about 12,000 g/mol to about 28,000 g/mol. Additionally or alternatively, the propylene homopolymers described herein can have a z-average molecular weight (Mz) in a range from about 80,000 g/mol to about 230,000 g/mol, from about 90,000 g/mol to about 200,000 g/mol, from about 90,000 g/mol to about 180,000 g/mol, or from about 100,000 g/mol to about 170,000 g/mol.

Unexpectedly, the propylene homopolymers of this invention can have a relatively high isotactic content. For instance, the isotacticity [mm] generally can fall within a range from about from about 93% to about 99%, from about 93% to about 98%, or from about 93% to about 97%. In some embodiments, the isotacticity [mm] of the polypropylene homopolymer can range from about from about 94% to about 99%, from about 94% to about 98%, or from about 96% to about 98%.

Also unexpectedly, the propylene homopolymers of this invention can have a relatively low amount of residual catalyst, e.g., zirconium from the metallocene compound used in the catalyst systems further discussed hereinbelow. This can be due, in part, to the high catalyst activities/productivities of the disclosed catalyst systems, and can be beneficial for a cleaner homopolymer for thin fiber applications. In one embodiment, the polypropylene homopolymer can contain from about 10 ppb to about 150 ppb, from about 10 ppb to about 100 ppb, from about 10 ppb to about 80 ppb, or from about 20 ppb to about 150 ppb (parts per billion by weight) of zirconium, while in another embodiment, the polypropylene homopolymer can contain from about 20 ppb to about 120 ppb, from about 20 ppb to about 80 ppb, from about 30 ppb to about 75 ppb, or from about 25 ppb to about 60 ppb (parts per billion by weight) of zirconium.

Moreover, because a vis-breaking step is not necessary to produce the polypropylene homopolymers disclosed herein, these polypropylene homopolymer can have substantially no peroxide residue or peroxide decomposition by-products. In this regard, substantially none means less than about 25 ppm (parts per million by weight), and in some embodiments, less than about 10 ppm, less than about 5 ppm, or 0 ppm (no measurable amount) of peroxide residue or peroxide decomposition by-products.

Generally, polypropylene homopolymers consistent with certain embodiments of the invention can have a unimodal molecular weight distribution curve (as determined using gel permeation chromatography (GPC) or other suitable analytical technique). In a unimodal molecular weight distribution curve, there is one identifiable peak in the molecular weight distribution curve. Additionally, the polypropylene homopolymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Articles and Fibers

Articles of manufacture can be formed from, or can comprise, the polypropylene homopolymers of this invention and, accordingly, are encompassed herein. Articles of manufacture also can be formed from, or can comprise, the polypropylene homopolymers of this invention and an additive, non-limiting examples of which can include an antioxidant, acid scavenger, antiblock additive, slip additive, colorant, filler, processing aid, UV inhibitor, and the like, as well as combinations thereof. Articles which can comprise polypropylene homopolymers of this invention can include, but are not limited to, a molded product (e.g., an injection molded product), a nonwoven article, or a fiber or fabric, and the like. As noted above, these articles also can contain one or more suitable additives, depending upon the processing technique employed and the end-use application. In some embodiments of this invention, an article of manufacture can comprise any of polypropylene homopolymers described herein, and the article of manufacture can be a fiber, or fabric, or nonwoven article.

Also contemplated herein is a method of making a fiber (e.g., a meltblown fiber, a spunbond fiber) comprising any polypropylene homopolymer disclosed herein. For instance, the method can comprise melt processing the polypropylene homopolymer (with or without one or more additives) through a fiber die to form the fiber. The melt processing can involve extruding the polypropylene homopolymer through the fiber die, but is not limited thereto. Fibers produced in accordance with this method also are encompassed herein.

The polypropylene homopolymer fibers can be of any suitable thickness or diameter, but often can have a fiber thickness or diameter ranging from about 0.1 microns to about 20 microns. Other suitable ranges for the fiber thickness or diameter include from about 0.5 microns to about 15 microns, from about 1 micron to about 12 microns, or from about 2 microns to about 10 microns.

Catalyst Compositions

In accordance with some embodiments of the present invention, the polypropylene homopolymer can be produced using a metallocene-based catalyst system. In further embodiments of the present invention, the polypropylene homopolymer can be produced using a single metallocene-based catalyst system. In these embodiments, the single metallocene compound can be a bridged metallocene compound, for instance, a racemic ansa-bis(indenyl)zirconocene compound. Generally, the racemic ansa-bis(indenyl)zirconocene compound can contain a silicon, carbon, or germanium bridging atom as part of the bridging group. Additionally or alternatively, the indenyl groups of the metallocene compound can be substituted indenyl groups, for instance, substituted with any suitable substituent, any suitable number of substituents, and at any suitable position(s) that conform(s) to the rules of chemical valence. Additionally or alternatively, the indenyl groups of the metallocene compound can have a phenyl or substituted phenyl substituent. Additionally or alternatively, the bridged metallocene compound can contain an alkenyl substituent, and the alkenyl substituent can be on the indenyl groups, the alkenyl substituent can be part of the bridging group (e.g., a substituent off of the bridging atom), or an alkenyl substituent can be on the indenyl groups and the same or a different alkenyl substituent can be part of the bridging group.

The racemic ansa-bis(indenyl)zirconocene compound can comprise, in particular embodiments of this invention, a bridged metallocene compound having formula (A):

rac-E(InR$_n$)$_2$ZrX$_2$ (A).

Within formula (A), E, In, each R, n, and each X are independent elements of the bridged metallocene compound. Accordingly, the bridged metallocene compound having formula (A) can be described using any combination of E, In, R, n, and X disclosed herein.

Each X in formula (A) independently can be a monoanionic ligand. In some embodiments, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $-OBR^Z_2$, or $-OSO_2R^Z$, wherein $R^Z$ is a $C_1$ to $C_{36}$ hydrocarbyl group. It is contemplated that each X can be either the same or a different monoanionic ligand.

In one embodiment, each X independently can be H, $BH_4$, a halide (e.g., F, Cl, and Br), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, each X independently can be H, $BH_4$, a halide, $OBR^Z_2$, or $OSO_2R^Z$, wherein $R^Z$ is a $C_1$ to $C_{18}$ hydrocarbyl group. In another embodiment, each X independently can be H, $BH_4$, a halide, a $C_1$ to $C_{12}$ hydrocarbyl group, a $C_1$ to $C_{12}$ hydrocarboxy group, a $C_1$ to $C_{12}$ hydrocarbylaminyl group, a $C_1$ to $C_{12}$ hydrocarbylsilyl group, a $C_1$ to $C_{12}$ hydrocarbylaminylsilyl group, $OBR^Z_2$, or $OSO_2R^Z$, wherein $R^Z$ is a $C_1$ to $C_{12}$ hydrocarbyl group. In another embodiment, each X independently can be H, $BH_4$, a halide, a $C_1$ to $C_{10}$ hydrocarbyl group, a $C_1$ to $C_{10}$ hydrocarboxy group, a $C_1$ to $C_{10}$ hydrocarbylaminyl group, a $C_1$ to $C_{10}$ hydrocarbylsilyl group, a $C_1$ to $C_{10}$ hydrocarbylaminylsilyl group, $OBR^Z_2$, or $OSO_2R^Z$, wherein $R^Z$ is a $C_1$ to $C_{10}$ hydrocarbyl group. In yet another embodiment, each X independently can be H, $BH_4$, a halide, a $C_1$ to $C_8$ hydrocarbyl group, a $C_1$ to $C_8$ hydrocarboxy group, a $C_1$ to $C_8$ hydrocarbylaminyl group, a $C_1$ to $C_8$ hydrocarbylsilyl group, a $C_1$ to $C_8$ hydrocarbylaminylsilyl group, $OBR^Z_2$, or $OSO_2R^Z$, wherein $R^Z$ is a $C_1$ to $C_8$ hydrocarbyl group. In still another embodiment, each X independently can be a halide or a $C_1$ to $C_{18}$ hydrocarbyl group. For example, each X can be Cl.

The hydrocarbyl group which can be an X (one or both) in formula (A) can be a $C_1$ to $C_{36}$ hydrocarbyl group, including, but not limited to, a $C_1$ to $C_{36}$ alkyl group, a $C_2$ to $C_{36}$ alkenyl group, a $C_4$ to $C_{36}$ cycloalkyl group, a $C_6$ to $C_{36}$ aryl group, or a $C_7$ to $C_{36}$ aralkyl group. For instance, each X independently can be a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, each X independently can be a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; alternatively, each X independently can be a $C_1$ to $C_{10}$ alkyl group, a $C_2$ to $C_{10}$ alkenyl group, a $C_4$ to $C_{10}$ cycloalkyl group, a $C_6$ to $C_{10}$ aryl group, or a $C_7$ to $C_{10}$ aralkyl group; or alternatively, each X independently can be a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group.

Accordingly, in some embodiments, the alkyl group which can be an X in formula (A) can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In some embodiments, the alkyl group which can be an X in formula (A) can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group.

Suitable alkenyl groups which can be an X in formula (A) can include, but are not limited to, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, or an octadecenyl group. Such alkenyl groups can be linear or branched, and the double bond can be located anywhere in the chain. In one embodiment, each X in formula (A) independently can be an ethenyl group, a propenyl group, a butenyl group, a pentenyl group, a hexenyl group, a heptenyl group, an octenyl group, a nonenyl group, or a decenyl group, while in another embodiment, each X in formula (A) independently can be an ethenyl group, a propenyl group, a butenyl group, a pentenyl group, or a hexenyl group. For example, an X can be an ethenyl group; alternatively, a propenyl group; alternatively, a butenyl group; alternatively, a pentenyl group; or alternatively, a hexenyl group. In yet another embodiment, an X can be a terminal alkenyl group, such as a $C_3$ to $C_{18}$ terminal alkenyl group, a $C_3$ to $C_{12}$ terminal alkenyl group, or a $C_3$ to $C_8$ terminal alkenyl group. Illustrative terminal alkenyl groups can include, but are not limited to, a prop-2-en-1-yl group, a bute-3-en-1-yl group, a pent-4-en-1-yl group, a hex-5-en-1-yl group, a hept-6-en-1-yl group, an octe-7-en-1-yl group, a non-8-en-1-yl group, a dece-9-en-1-yl group, and so forth.

Each X in formula (A) independently can be a cycloalkyl group, including, but not limited to, a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group. For example, an X in formula (A) can be a cyclopentyl group, a substituted cyclopentyl group, a cyclohexyl group, or a substituted cyclohexyl group. Moreover, each X in formula (A) independently can be a cyclobutyl group or a substituted cyclobutyl group; alternatively, a cyclopentyl group or a substituted cyclopentyl group; alternatively, a cyclohexyl group or a substituted cyclohexyl group; alternatively, a cycloheptyl group or a substituted cycloheptyl group; alternatively, a cyclooctyl group or a substituted cyclooctyl group; alternatively, a cyclopentyl group; alternatively, a substituted cyclopentyl group; alternatively, a cyclohexyl group; or alternatively, a substituted cyclohexyl group. Substituents which can be utilized for the substituted cycloalkyl group are independently disclosed herein and can be utilized without limitation to further describe the substituted cycloalkyl group which can be an X in formula (A).

In some embodiments, the aryl group which can be an X in formula (A) can be a phenyl group, a substituted phenyl group, a naphthyl group, or a substituted naphthyl group. In an embodiment, the aryl group can be a phenyl group or a substituted phenyl group; alternatively, a naphthyl group or a substituted naphthyl group; alternatively, a phenyl group or a naphthyl group; alternatively, a substituted phenyl group or a substituted naphthyl group; alternatively, a phenyl group; or alternatively, a naphthyl group. Substituents which can be utilized for the substituted phenyl groups or substituted naphthyl groups are independently disclosed herein and can be utilized without limitation to further describe the substituted phenyl groups or substituted naphthyl groups which can be an X in formula (A).

In an embodiment, the substituted phenyl group which can be an X in formula (A) can be a 2-substituted phenyl group, a 3-substituted phenyl group, a 4-substituted phenyl group, a 2,4-disubstituted phenyl group, a 2,6-disubstituted phenyl group, a 3,5-disubstituted phenyl group, or a 2,4,6-trisubstituted phenyl group. In other embodiments, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, a 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be an X in formula (A).

In some embodiments, the aralkyl group which can be an X in formula (A) can be a benzyl group or a substituted benzyl group. In an embodiment, the aralkyl group can be a benzyl group or, alternatively, a substituted benzyl group. Substituents which can be utilized for the substituted aralkyl group are independently disclosed herein and can be utilized without limitation to further describe the substituted aralkyl group which can be an X in formula (A).

In an embodiment, each non-hydrogen substituent(s) for the substituted cycloalkyl group, substituted aryl group, or substituted aralkyl group which can be an X in formula (A) independently can be a $C_1$ to $C_{18}$ hydrocarbyl group; alternatively, a $C_1$ to $C_8$ hydrocarbyl group; or alternatively, a $C_1$ to $C_5$ hydrocarbyl group. Specific hydrocarbyl groups are independently disclosed herein and can be utilized without limitation to further describe the substituents of the substituted cycloalkyl groups, substituted aryl groups, or substituted aralkyl groups which can be an X in formula (A). For instance, the hydrocarbyl substituent can be an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like. Furthermore, the hydrocarbyl substituent can be a benzyl group, a phenyl group, a tolyl group, or a xylyl group, and the like.

A hydrocarboxy group is used generically herein to include, for instance, alkoxy, aryloxy, aralkoxy, -(alkyl, aryl, or aralkyl)-O-(alkyl, aryl, or aralkyl) groups, and —O(CO)-(hydrogen or hydrocarbyl) groups, and these groups can comprise up to about 36 carbon atoms (e.g., $C_1$ to $C_{36}$, $C_1$ to $C_{18}$, $C_1$ to $C_{10}$, or $C_1$ to $C_8$ hydrocarboxy groups). Illustrative and non-limiting examples of hydrocarboxy groups which can be an X in formula (A) can include, but are not limited to, a methoxy group, an ethoxy group, an n-propoxy group, an isopropoxy group, an n-butoxy group, a sec-butoxy group, an isobutoxy group, a tert-butoxy group, an n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, a neo-pentoxy group, a phenoxy group, a toloxy group, a xyloxy group, a 2,4,6-trimethylphenoxy group, a benzoxy group, an acetylacetonate group (acac), a formate group, an acetate group, a stearate group, an oleate group, a benzoate group, and the like. In an embodiment, the hydrocarboxy group which can be an X in formula (A) can be a methoxy group; alternatively, an ethoxy group; alternatively, an n-propoxy group; alternatively, an isopropoxy group; alternatively, an n-butoxy group; alternatively, a sec-butoxy group; alternatively, an isobutoxy group; alternatively, a tert-butoxy group; alternatively, an n-pentoxy group; alternatively, a 2-pentoxy group; alternatively, a 3-pentoxy group; alternatively, a 2-methyl-1-butoxy group; alternatively, a tert-pentoxy group; alternatively, a 3-methyl-1-butoxy group, alternatively, a 3-methyl-2-butoxy group; alternatively, a neo-pentoxy group; alternatively, a phenoxy group; alternatively, a toloxy group; alternatively, a xyloxy group; alternatively, a 2,4,6-trimethylphenoxy group; alternatively, a benzoxy group; alternatively, an acetylacetonate group; alternatively, a formate group; alternatively, an acetate group; alternatively, a stearate group; alternatively, an oleate group; or alternatively, a benzoate group.

The term hydrocarbylaminyl group is used generically herein to refer collectively to, for instance, alkylaminyl, arylaminyl, aralkylaminyl, dialkylaminyl, diarylaminyl, diaralkylaminyl, and -(alkyl, aryl, or aralkyl)-N-(alkyl, aryl, or aralkyl) groups, and unless otherwise specified, the hydrocarbylaminyl groups which can be an X in formula (A) can comprise up to about 36 carbon atoms (e.g., $C_1$ to $C_{36}$, $C_1$ to $C_{18}$, $C_1$ to $C_{10}$, or $C_1$ to $C_8$ hydrocarbylaminyl groups). Accordingly, hydrocarbylaminyl is intended to cover both (mono)hydrocarbylaminyl and dihydrocarbylaminyl groups. In some embodiments, the hydrocarbylaminyl group which can be an X in formula (A) can be, for instance, a methylaminyl group (—NHCH$_3$), an ethylaminyl group (—NHCH$_2$CH$_3$), an n-propylaminyl group (—NHCH$_2$CH$_2$CH$_3$), an iso-propylaminyl group (—NHCH(CH$_3$)$_2$), an n-butylaminyl group (—NHCH$_2$CH$_2$CH$_2$CH$_3$), a t-butylaminyl group (—NHC(CH$_3$)$_3$), an n-pentylaminyl group (—NHCH$_2$CH$_2$CH$_2$CH$_2$CH$_3$), a neo-pentylaminyl group (—NHCH$_2$C(CH$_3$)$_3$), a phenylaminyl group (—NHC$_6$H$_5$), a tolylaminyl group (—NHC$_6$H$_4$CH$_3$), or a xylylaminyl group (—NHC$_6$H$_3$(CH$_3$)$_2$); alternatively, a methylaminyl group; alternatively, an ethylaminyl group; alternatively, a propylaminyl group; or alternatively, a phenylaminyl group. In other embodiments, the hydrocarbylaminyl group which can be an X in formula (A) can be, for instance, a dimethylaminyl group (—N(CH$_3$)$_2$), a diethylaminyl group (—N(CH$_2$CH$_3$)$_2$), a di-n-propylaminyl group (—N(CH$_2$CH$_2$CH$_3$)$_2$), a di-iso-propylaminyl group (—N(CH(CH$_3$)$_2$)$_2$), a di-n-butylaminyl group (—N(CH$_2$CH$_2$CH$_2$CH$_3$)$_2$), a di-t-butylaminyl group (—N(C(CH$_3$)$_3$)$_2$), a di-n-pentylaminyl group (—N(CH$_2$CH$_2$CH$_2$CH$_2$CH$_3$)$_2$), a di-neo-pentylaminyl group (—N(CH$_2$C(CH$_3$)$_3$)$_2$), a di-phenylaminyl group (—N(C$_6$H$_5$)$_2$), a di-tolylaminyl group (—N(C$_6$H$_4$CH$_3$)$_2$), or a di-xylylaminyl group (—N(C$_6$H$_3$(CH$_3$)$_2$)$_2$); alternatively, a dimethylaminyl group; alternatively, a di-ethylaminyl group; alternatively, a di-n-propylaminyl group; or alternatively, a di-phenylaminyl group.

In accordance with some embodiments disclosed herein, each X independently can be a $C_1$ to $C_{36}$ hydrocarbylsilyl group; alternatively, a $C_1$ to $C_{24}$ hydrocarbylsilyl group; alternatively, a $C_1$ to $C_{18}$ hydrocarbylsilyl group; or alternatively, a $C_1$ to $C_8$ hydrocarbylsilyl group. In an embodiment, each hydrocarbyl (one or more) of the hydrocarbylsilyl group can be any hydrocarbyl group disclosed herein (e.g., a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group). As used herein, hydrocarbylsilyl is intended to cover (mono)hydrocarbylsilyl (—SiH$_2$R), dihydrocarbylsilyl (—SiHR$_2$), and trihydrocarbylsilyl (—SiR$_3$) groups, with R being a hydrocarbyl group. In one embodiment, the hydrocarbylsilyl group can be a $C_3$ to $C_{36}$ or a $C_3$ to $C_{18}$ trihydrocarbylsilyl group, such as, for example, a trialkylsilyl group or a triphenylsilyl group. Illustrative and non-limiting examples of hydrocarbylsilyl groups which can be an X in formula (A) can include, but are not limited to, trimethylsilyl, triethylsilyl, tripropylsilyl (e.g., trii sopropylsilyl), tributylsilyl, tripentylsilyl, triphenylsilyl, allyldimethylsilyl, and the like.

A hydrocarbylaminylsilyl group is used herein to refer to groups containing at least one hydrocarbon moiety, at least one N atom, and at least one Si atom. Illustrative and non-limiting examples of hydrocarbylaminylsilyl groups which can be an X include, but are not limited to, —N(SiMe$_3$)$_2$, —N(SiEt$_3$)$_2$, and the like. Unless otherwise specified, the hydrocarbylaminylsilyl groups which can be an X can comprise up to about 36 carbon atoms (e.g., $C_1$ to $C_{36}$, $C_1$ to $C_{18}$, $C_1$ to $C_{12}$, or $C_1$ to $C_8$ hydrocarbylaminylsilyl groups). In an embodiment, each hydrocarbyl (one or more) of the hydrocarbylaminylsilyl group can be any hydrocarbyl group disclosed herein (e.g., a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group). Moreover, hydrocarbylaminylsilyl is intended to cover —NH(SiH$_2$R), —NH(SiHR$_2$), —NH(SiR$_3$), —N(SiH$_2$R)$_2$, —N(SiHR$_2$)$_2$, and —N(SiR$_3$)$_2$ groups, among others, with R being a hydrocarbyl group.

In an embodiment, each X independently can be —OBR$^Z$$_2$ or —OSO$_2$R$^Z$, wherein R$^Z$ is a $C_1$ to $C_{36}$ hydrocarbyl group, or alternatively, a $C_1$ to $C_{18}$ hydrocarbyl group. The hydrocarbyl group in OBR$^Z$$_2$ and OSO$_2$R$^Z$ independently can be any hydrocarbyl group disclosed herein, such as, for instance, a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; or alternatively, a $C_1$ to $C_8$ alkyl group, a $C_2$ to $C_8$ alkenyl group, a $C_5$ to $C_8$ cycloalkyl group, a $C_6$ to $C_8$ aryl group, or a $C_7$ to $C_8$ aralkyl group.

In one embodiment, each X independently can be H, BH$_4$, a halide, or a $C_1$ to $C_{36}$ hydrocarbyl group, hydrocarboxy group, hydrocarbylaminyl group, hydrocarbylsilyl group, or hydrocarbylaminylsilyl group, while in another embodiment, each X independently can be H, BH$_4$, or a $C_1$ to $C_{18}$ hydrocarboxy group, hydrocarbylaminyl group, hydrocarbylsilyl group, or hydrocarbylaminylsilyl group. In yet another embodiment, each X independently can be a halide; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group. In still another embodiment, both X's can be H; alternatively, F; alternatively, Cl; alternatively, Br; alternatively, I; alternatively, BH$_4$; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group.

Each X independently can be, in some embodiments, H, a halide, methyl, phenyl, benzyl, an alkoxy, an aryloxy, acetylacetonate, formate, acetate, stearate, oleate, benzoate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a hydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other embodiments, the alkoxy, aryloxy, alkylaminyl, dialkylaminyl, trihydrocarbylsilyl, and hydrocarbylaminylsilyl can be a $C_1$ to $C_{36}$, a $C_1$ to $C_{18}$, a $C_1$ to $C_{12}$, or a $C_1$ to $C_8$ alkoxy, aryloxy, alkylaminyl, dialkylaminyl, trihydrocarbylsilyl, and hydrocarbylaminylsilyl.

Moreover, each X independently can be, in certain embodiments, a halide or a $C_1$ to $C_{18}$ hydrocarbyl group; alternatively, a halide or a $C_1$ to $C_8$ hydrocarbyl group; alternatively, F, Cl, Br, I, methyl, benzyl, or phenyl; alternatively, Cl, methyl, benzyl, or phenyl; alternatively, a $C_1$ to $C_{18}$ alkoxy, aryloxy, alkylaminyl, dialkylaminyl, trihydrocarbylsilyl, or hydrocarbylaminylsilyl group; alternatively, a $C_1$ to $C_8$ alkoxy, aryloxy, alkylaminyl, dialkylaminyl, trihydrocarbyl silyl, or hydrocarbylaminyl silyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (A), In is an indenyl group, either substituted or unsubstituted, and the integer n can be any integer from 0 to 6 (inclusive). In one embodiment, therefore, n can be equal to 0, and In can be an unsubstituted indenyl group. Alternatively, In can be a substituted indenyl group, having from 1 up to 6 substituents. In another embodiment, n can be from 1 to 5, from 1 to 4, from 1 to 3, from 2 to 4, equal to 1, or equal to 2.

If present, each substituent R on In independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Each substituent on In can be either the same or a different substituent group. Moreover, each substituent can be at any position on the indenyl ring structure that conforms with the rules of chemical valence. In an embodiment, two or more substituents on In can be different, or alternatively, each substituent on In can be the same. As noted above, if substituted, the indenyl group In can have one substituent (n is equal to 1), two substituents (n is equal to 2), three substituents (n is equal to 3), and so forth.

In formula (A), each substituent R on the indenyl group In independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. In some embodiments, each substituent independently can be H; alternatively, a halide; alternatively, a $C_1$ to $C_{18}$ hydrocarbyl group; alternatively, a $C_1$ to $C_{18}$ halogenated hydrocarbyl group; alternatively, a $C_1$ to $C_{18}$ hydrocarboxy group; alternatively, a $C_1$ to $C_{18}$ hydrocarbylsilyl group; alternatively, a $C_1$ to $C_{12}$ hydrocarbyl group or a $C_1$ to $C_{12}$ hydrocarbylsilyl group; or alternatively, a $C_1$ to $C_8$ alkyl group or a $C_3$ to $C_8$ alkenyl group. The halide, $C_1$ to $C_{36}$ hydrocarbyl group, $C_1$ to $C_{36}$ hydrocarboxy group, and $C_1$ to $C_{36}$ hydrocarbylsilyl group which can be R in formula (A) can be any halide, $C_1$ to $C_{36}$ hydrocarbyl group, $C_1$ to $C_{36}$ hydrocarboxy group, and $C_1$ to $C_{36}$ hydrocarbylsilyl group described herein (e.g., as pertaining to X in formula (A)). A substituent R on In in formula (A) can be, in certain embodiments, a $C_1$ to $C_{36}$ halogenated hydrocarbyl group, where the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

As a non-limiting example, each R independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, an alkyl-substituted phenyl group (e.g., a t-Bu-phenyl group), a benzyl group, a naphthyl group, a carbazolyl group, a trimethylsilyl group, a triisopropylsilyl group, a triphenylsilyl group, or an allyldimethylsilyl group; alternatively, H; alternatively, Cl; alternatively, $CF_3$; alternatively, a methyl group; alternatively, an ethyl group; alternatively, a propyl group; alternatively, a butyl group; alternatively, a pentyl group; alternatively, a hexyl group; alternatively, a heptyl group; alternatively, an octyl group, a nonyl group; alternatively, a decyl group; alternatively, an ethenyl group; alternatively, a propenyl group; alternatively, a butenyl group; alternatively, a pentenyl group; alternatively, a hexenyl group; alternatively, a heptenyl group; alternatively, an octenyl group; alternatively, a nonenyl group; alternatively, a decenyl group; alternatively, a phenyl group (or alkyl-substituted phenyl group); alternatively, a tolyl group; alternatively, a benzyl group; alternatively, a naphthyl group; alternatively, a trimethylsilyl group; alternatively, a triisopropylsilyl group; alternatively, a triphenylsilyl group; or alternatively, an allyldimethylsilyl group.

In one embodiment, each R independently can be a $C_1$ to $C_{18}$ hydrocarbyl group. In another embodiment, at least one R can be a $C_1$ to $C_{12}$ hydrocarbyl group; alternatively, a $C_1$ to $C_8$ alkyl or alkenyl group; or alternatively, a $C_1$ to $C_6$ alkyl group. In yet another embodiment, at least one R can be a $C_1$ to $C_8$ alkyl group, a $C_3$ to $C_8$ terminal alkenyl group, a phenyl group, or a $C_7$ to $C_{18}$ (or $C_7$ to $C_{12}$) alkyl-substituted phenyl group. In still another embodiment, n can be equal to 2, and one R can be an alkyl or alkenyl group (e.g., having up to 18 carbon atoms, up to 12 carbon atoms, or up to 6 carbon atoms), and the other R can be a phenyl or alkyl-substituted phenyl group (having up to 18 carbon atoms, up to 12 carbon atoms, or up to 10 carbon atoms).

Bridging group E in formula (A) can be a bridging group having the formula $>E^A R^1 R^2$, wherein $E^A$ can be a carbon, silicon, or germanium bridging atom, and $R^1$ and $R^2$ independently can be any substituent disclosed herein. The ">" in this formula is meant to indicate that bridging atom $E^A$ is a bridge between the two indenyl groups.

In one embodiment of this invention, $E^A$ can be a carbon atom, while in another embodiment, $E^A$ can be a silicon atom. In these and other embodiments, $R^1$ and $R^2$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group; alternatively, H or a $C_1$ to $C_{18}$ hydrocarbyl group; alternatively, H or a $C_1$ to $C_{12}$ hydrocarbyl group; alternatively, a $C_1$ to $C_8$ hydrocarbyl group; alternatively, a phenyl group, a $C_1$ to $C_8$ alkyl group, or a $C_3$ to $C_8$ terminal alkenyl group; or alternatively, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group. For instance, at least one of $R^1$ and $R^2$ can be a phenyl group, at least one of $R^1$ and $R^2$ can be an alkyl group (e.g., a $C_1$ to $C_8$ alkyl group), or at least one of $R^1$ and $R^2$ can be an alkenyl group (e.g., a $C_3$ to $C_8$ terminal alkenyl group). As an example, $R^1$ and $R^2$ can be phenyl groups, or $R^1$ can be a $C_1$ to $C_8$ alkyl group and $R^2$ can be a $C_3$ to $C_8$ terminal alkenyl group, or $R^1$ can be a phenyl group and $R^2$ can be a $C_3$ to $C_8$ terminal alkenyl group, and so forth.

Illustrative and non-limiting examples of racemic ansa-bis(indenyl)zirconocene compounds having formula (A) and suitable for use as a metallocene compound in catalyst compositions of this invention can include the following compounds (Me=methyl):

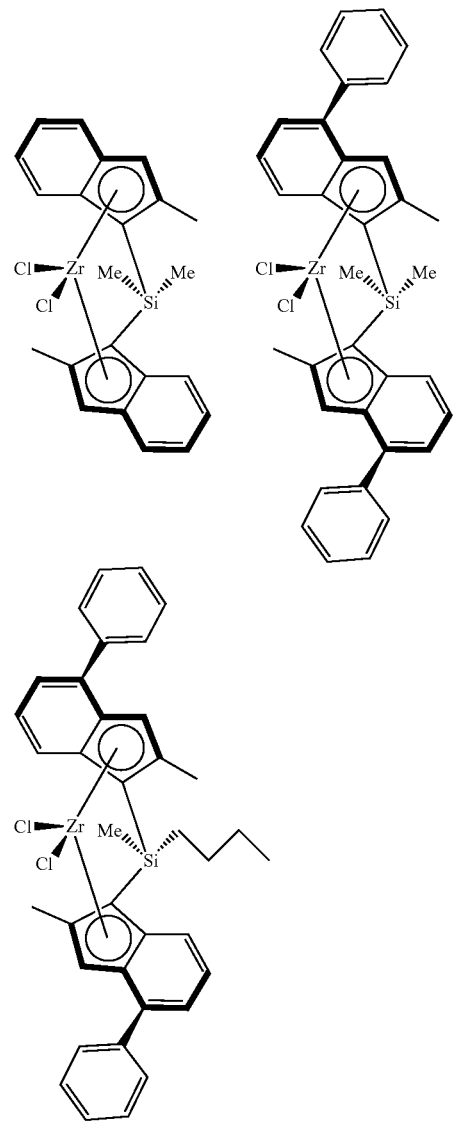

-continued

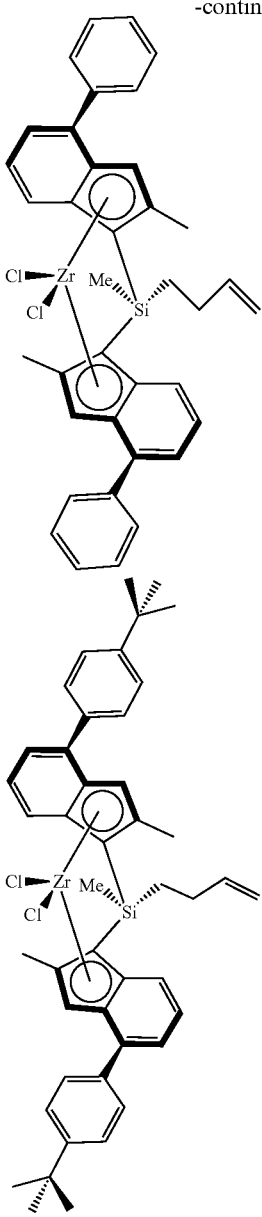

and the like, as well as combinations thereof.

Typically, the catalyst compositions of this invention comprise a racemic ansa-bis(indenyl)zirconocene compound, an activator-support, and an optional co-catalyst. The activator-support can comprise any suitable solid oxide treated with any suitable electron-withdrawing anion. Examples of such materials are disclosed in, for instance, U.S. Pat. Nos. 7,294,599, 7,601,665, 7,884,163, 8,309,485, 8,623,973, and 9,023,959, which are incorporated herein by reference in their entirety. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In another embodiment, the activator-support can comprise a fluorided solid oxide, a sulfated solid oxide, or a combination thereof. In this embodiment, the activator-support can comprise fluorided alumina, sulfated alumina, fluorided silica-alumina, sulfated silica-alumina, fluorided silica-coated alumina, fluorided-chlorided silica-coated alumina, sulfated silica-coated alumina, and the like, as well as any combination thereof.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides or sulfated solid oxides) are well known to those of skill in the art.

The present invention can employ catalyst compositions containing a racemic ansa-bis(indenyl)zirconocene compound (one or more than one), an activator-support (one or more than one), and optionally, a co-catalyst. When present, the co-catalyst can include, but is not limited to, metal alkyl, or organometal, co-catalysts, with the metal encompassing boron, aluminum, and the like. Optionally, the catalyst systems provided herein can comprise a co-catalyst, or a combination of co-catalysts. For instance, alkyl borons, alkyl aluminums, or combinations thereof, often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include, trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof.

Co-catalysts that can be used in the catalyst compositions of this invention are not limited to the co-catalysts described above. Other suitable co-catalysts are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

In another embodiment of the present invention, a catalyst composition is provided which comprises a racemic ansa-bis(indenyl)zirconocene compound, an activator-support, and an organoaluminum compound, wherein this catalyst composition is substantially free of aluminoxanes, organoboron or organoborate compounds, ionizing ionic compounds, and other similar materials; alternatively, substantially free of aluminoxanes; alternatively, substantially free or organoboron or organoborate compounds; or alternatively, substantially free of ionizing ionic compounds. In these embodiments, the catalyst composition has catalyst activity, discussed below, in the absence of these additional materials. For example, a catalyst composition of the present invention can consist essentially of a racemic ansa-bis (indenyl)zirconocene compound, an activator-support, and an organoaluminum compound, wherein no other materials are present in the catalyst composition which would increase/decrease the activity of the catalyst composition by more than about 10% from the catalyst activity of the catalyst composition in the absence of said materials.

This invention further encompasses methods of making these catalyst compositions, such as, for example, contacting the respective catalyst components in any order or sequence. In one embodiment, the catalyst composition can be produced by a process comprising contacting the racemic ansa-bis(indenyl)zirconocene compound and the activator-support, while in another embodiment, the catalyst composition can be produced by a process comprising contacting, in any order, the racemic ansa-bis(indenyl)zirconocene compound, the activator-support, and the co-catalyst, such as an organoaluminum compound.

Generally, the weight ratio of organoaluminum compound to activator-support can be in a range from about 10:1 to about 1:1000. If more than one organoaluminum compound and/or more than one activator-support are employed, this ratio is based on the total weight of each respective component. In another embodiment, the weight ratio of the organoaluminum compound to the activator-support can be in a range from about 3:1 to about 1:100, or from about 1:1 to about 1:50.

In some embodiments of this invention, the weight ratio of metallocene compound to activator-support can be in a range from about 1:1 to about 1:1,000,000. If more than one metallocene compound and/or more than activator-support is/are employed, this ratio is based on the total weights of the respective components. In another embodiment, this weight ratio can be in a range from about 1:5 to about 1:100,000, or from about 1:10 to about 1:10,000. Yet, in another embodiment, the weight ratio of the metallocene compound to the activator-support can be in a range from about 1:20 to about 1:1000.

Catalyst compositions of the present invention generally have a catalyst activity (or a catalyst productivity) of at least about 1,000 grams, at least about 2,000 grams, at least about 3,500 grams, or at least about 5,000 grams, and often can range up to about 10,000 grams, up to about 15,000 grams, up to about 20,000 grams, or up to about 25,000 grams of polypropylene homopolymer per gram of activator-support per hour (or grams of polypropylene homopolymer per gram of activator-support). These activities (or productivities) are measured under bulk polymerization conditions, with a triisobutylaluminum co-catalyst, a polymerization temperature of 77° C. and a reactor pressure of 520 psig (3.58 MPa). Additionally, in some embodiments, the activator-support can comprise sulfated alumina, fluorided silica-alumina, or fluorided silica-coated alumina, although not limited thereto.

Additionally or alternatively, the disclosed catalyst compositions can have a catalyst activity (or a catalyst productivity) of at least about 250,000 grams, at least about 500,000 grams, at least about 1,000,000 grams, or at least about 1,500,000 grams, and often can range up to about 2,000,000 grams, up to about 3,000,000 grams, up to about 4,000,000 grams, or up to about 5,000,000 grams of polypropylene homopolymer per gram of metallocene compound per hour (or grams of polypropylene homopolymer per gram of metallocene compound). As above, these activities (or productivities) are measured under bulk polymerization conditions, with a triisobutylaluminum co-catalyst, a polymerization temperature of 77° C. and a reactor pressure of 520 psig (3.58 MPa).

In circumstances where the metallocene compound comprises an alkenyl substituent, the catalyst activity (or the catalyst productivity) of the catalyst composition can be greater than that of a catalyst composition containing a similar metallocene compound without the alkenyl substituent, under the same polymerization conditions (bulk polymerization conditions, with a triisobutylaluminum co-catalyst, 600 molar ppm of $H_2$, a polymerization temperature of 77° C. and a reactor pressure of 520 psig (3.58 MPa)) and using the same catalyst preparation conditions and catalyst components (other than the metallocene compound). Thus, the only difference is a metallocene compound with an alkenyl substituent as compared to an otherwise identical metallocene compound without the alkenyl substituent. In some embodiments, the catalyst activity (or the catalyst productivity) of the catalyst composition using the metallocene compound with the alkenyl substituent can be at least about 10% greater, at least about 15% greater, or at least about 25% greater, and often can range up to about 100%, or up to about 200% greater, than that of a catalyst composition containing a similar metallocene compound without the alkenyl substituent.

Polymerization Processes

The disclosed catalyst compositions can be used to polymerize propylene to form a polypropylene homopolymer. One such polymerization process can comprise contacting the catalyst composition with propylene in a polymerization reactor system under polymerization conditions to produce the polypropylene homopolymer. The polypropylene homopolymer can be produced using any suitable olefin polymerization process using various types of polymerization reactors, polymerization reactor systems, and polymerization reaction conditions. As used herein, "polymerization reactor" includes any polymerization reactor capable of polymerizing propylene to produce a polypropylene homopolymer. The various types of polymerization reactors include, but are not limited to, those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave reactors, tubular reactors, or combinations thereof, in parallel or in series. Reactor types can include batch or continuous processes. Continuous processes can use intermittent or continuous product discharge. Polymerization reactor systems and processes also can include partial or full direct recycle of unreacted monomer and diluent (if used).

A polymerization reactor system can comprise a single reactor or multiple reactors (for example, 2 reactors, or more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by at least one transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop or gas phase reactors. The multiple reactors can be operated in series, in parallel, or both. For instance, a representative reactor system can include a loop reactor (one or more) in series with a gas phase reactor (one or more).

According to one embodiment, the polymerization reactor system can comprise at least one loop slurry reactor comprising vertical or horizontal loops. Monomer, diluent (if used), catalyst, and comonomer (if used) can be continuously fed into a loop reactor where polymerization occurs. Generally, continuous processes can comprise the continuous introduction of monomer (and comonomer, if used), catalyst, and diluent (if used) into a polymerization reactor and the continuous removal from this reactor of a suspension comprising polymer particles and monomer or diluent. The wt. % solids in the loop reactor often can range from about 30 wt. % to about 55 wt. %, or from about 40 wt. % to about 70 wt. %. Reactor effluent can be flashed to remove the solid polymer from the liquids that comprise the diluent (if used), monomer, and comonomer (if used). Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another embodiment, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327, each of which is incorporated by reference in its entirety herein.

According to still another embodiment, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, or catalyst components can be entrained in a gaseous stream and introduced at another zone of the reactor. The gas streams can be intermixed for polymerization. Heat and pressure can be employed appropriately to obtain optimal polymerization reaction conditions.

According to yet another embodiment, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the polypropylene homopolymer, hydrogen can be added to the polymerization reactor as needed (e.g., continuously or pulsed) or as described herein.

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of polypropylene homopolymer. A suitable polymerization temperature can be any temperature below the de-polymerization temperature according to the Gibbs Free energy equation. Typically, this includes from about 25° C. to about 280° C., for example, or from about 25° C. to about 175° C., depending upon the type of polymerization reactor. In some reactor systems, the polymerization temperature generally can be within a range from about 60° C. to about 130° C., or from about 60° C. to about 95° C.

Suitable pressures will also vary according to the reactor and polymerization type. The pressure for liquid phase polymerizations in a loop reactor typically can be less than 1000 psig (6.89 MPa). The pressure for gas phase polymerization can be in the 200 psig (1.38 MPa) to 500 psig (3.45 MPa) range. High pressure polymerization in tubular or autoclave reactors generally can be conducted at about 20,000 psig (137.9 MPa) to 75,000 psig (517.1 MPa). Polymerization reactors also can be operated in a supercritical region occurring at generally higher temperatures and pressures (for instance, above 92° C. and 700 psig (4.83 MPa)). Operation above the critical point of a pressure/ temperature diagram (supercritical phase) can offer advantages to the polymerization reaction process.

Consistent with embodiments of this invention, the polymerization processes are often conducted in the presence of $H_2$. For example, the process can be conducted in the presence of a molar amount of $H_2$, based on propylene, ranging from about 100 ppm to about 2500 ppm, from about 200 ppm to about 2000 ppm, or from about 300 ppm to about 1500 ppm $H_2$. These numbers are based on reactor contents under bulk polymerization conditions.

Unexpectedly, and beneficially, the polypropylene melt flow rate (MFR) can increase dramatically with the addition of $H_2$ to the polymerization process. For instance, the MFR can increase by from about 200% to about 1000%, or from about 250% to about 900%, based on an increase in molar $H_2$ concentration (based on propylene) from 600 ppm to 1100 ppm. Also unexpectedly, the ratio of Mw/Mn can be substantially constant (within +/−25%, and often within +/−15%) over a range of from 600 molar ppm $H_2$ to 1000 molar ppm $H_2$. Thus, the polypropylenes produced by the processes disclosed herein can have a flat or substantially constant ratio of Mw/Mn with increasing hydrogen concentration.

In circumstances where the metallocene compound comprises an alkenyl substituent, the Mw/Mn of the polypropylene homopolymer produced by the process can be less (e.g., from about 5% to about 100% less, or from about 10% to about 75% less) than that of a homopolymer obtained using a similar metallocene compound without the alkenyl substituent, under the same polymerization conditions, and using the same catalyst preparation conditions and catalyst components (other than the metallocene compound). The polymerization conditions can be bulk polymerization conditions, with a triisobutylaluminum co-catalyst, 600 molar ppm of $H_2$, a polymerization temperature of 77° C. and a reactor pressure of 520 psig (3.58 MPa). Thus, the only difference is a metallocene compound with an alkenyl substituent as compared to an otherwise identical metallocene compound without the alkenyl substituent.

This invention is also directed to, and encompasses, the polypropylene homopolymers produced by any of the polymerization processes disclosed herein. Articles of manufacture (such as fibers and nonwoven articles) can be formed from, or can comprise, the homopolymers produced in accordance with this invention.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt flow rate (MFR, g/10 min) was determined in accordance with ASTM D1238 at 230° C. with a 2,160 gram weight for lower melt flow rate polypropylene resins (MFR less than 700 g/10 min). For higher melt flow rate polypropylene resins, dynamic frequency sweep measurement were utilized. First, the polypropylene fluff sample was compression molded at 182° C. for a total of 3 minutes. The samples were allowed to melt at a relatively low pressure for 1 minute, and then subjected to a high molding pressure for an additional 2 minutes. The molded samples were then quenched in a cold (room temperature) press, and then 25.4 mm diameter disks were stamped out of the molded slabs for measurement in a rotational rheometer.

The measurements were performed in parallel plates of 25 mm in diameter at 190° C. using a controlled-stress rheometer (Physica MCR-500, Anton Paar). The test chamber of the rheometer was purged with nitrogen to minimize oxidative degradation. After thermal equilibration, the specimens were squeezed between the plates to a 1.0 mm thickness, and the excess was trimmed. The dynamic frequency sweep test was performed with 10% strain in the linear viscoelastic regime at angular frequencies from 0.1 to 10 rad/s. The magnitudes of complex modulus $|\eta^*|$ were almost constant in this frequency range. The average of the viscosities in the frequency range of 0.1~10 rad/s well represented the flow properties of the high MFR polypropylenes, and therefore, the average viscosity for each high MFR sample was determined by calculating the average of 9 viscosity measurements taken at approximately 0.1 rad/s, 0.178 rad/s, 0.316 rad/s, 0.562 rad/s, 1 rad/s, 1.78 rad/s, 3.16 rad/s, 5.62 rad/s, and 10 rad/s.

The average viscosities (Pa-s) were then used to estimate the MFR (g/10 min) using the following equation, which was determined from the power law fit of the average viscosities of 3 high melt flow (500 g/10 min, 1200 g/10 min, 1800 g/10 min, as determined by ASTM D1238) standard samples: MFR=15,260 (viscosity)$^{-0.903}$. The plot correlating MFR to average viscosity is illustrated in FIG. 1.

Molecular weights and molecular weight distribution curves were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 400 μL was used. The integral calibration method was used to deduce molecular weights and molecular weight distributions using a Chevron Phillips Chemical Company's HDPE polyethylene resin, MARLEX® BHB5003, as the broad standard. The integral table of the standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

The peak melting point (Tm) was determined using Differential Scanning calorimetry (DSC) as described in ASTM D3418 (2nd heat, ° C.) at a heating rate of 10° C./min.

Triad determination and the tacticity of the polypropylene homopolymer were determined utilizing $^{13}$C NMR peak intensities and the methods as described in Zambelli, A.; Locatelli, P.; Bajo, G.; Bovey, F. A.; *Macromolecules,* 1975, 8 (5), 687-689.

Fluorided silica-coated alumina activator-supports were prepared as follows. Bohemite was obtained from W.R. Grace & Company under the designation "Alumina A" and having a surface area of about 300 m²/g, a pore volume of about 1.3 mL/g, and an average particle size of about 100 microns. The alumina was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina (FSCA) was collected and stored under dry nitrogen, and was used without exposure to the atmosphere.

The structures of the racemic ansa-bis(indenyl)zirconocene compounds (A, B, C, D, E) used in Examples 1-105 are shown below:

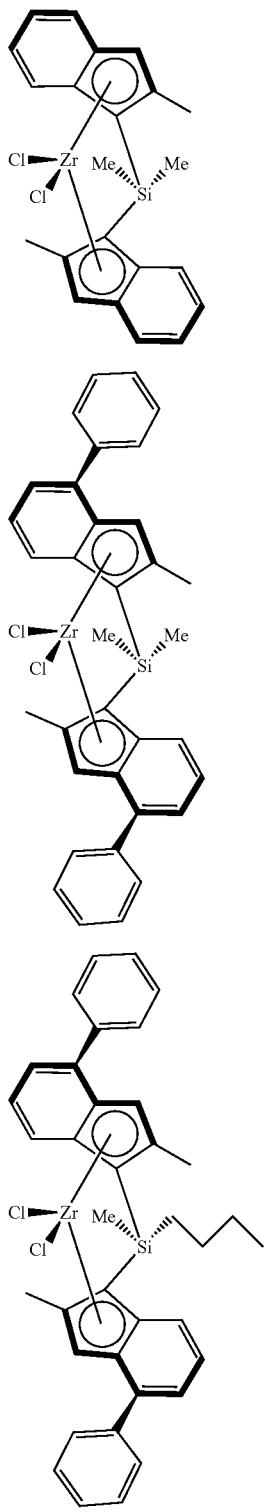
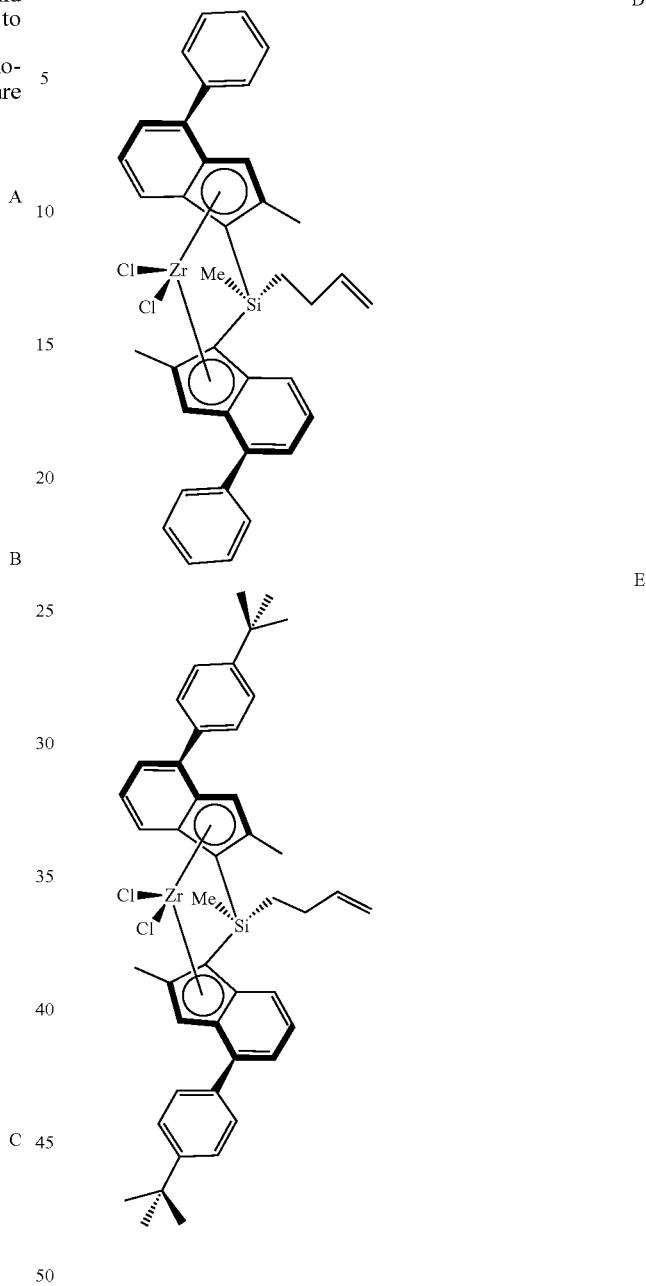

Examples 1-108

Examples 1-77 were performed in a 1-gallon autoclave reactor, using triisobutylaluminum (TIBA) purchased from Sigma-Aldrich as a 1.0 M solution in heptane, and fluorided silica-coated alumina (FSCA) as the activator-support. Table I summarizes the polymerization conditions used for Examples 1-77, with variations in the hydrogen addition method provided below.

For Method N (no hydrogen added), the metallocene compound, FSCA, and TIBA were charged to a syringe and slurried in hexanes. The catalyst system slurry was charged to the 1-gallon reactor under a nitrogen stream. The reactor was sealed and charged with 2.5 L of liquid propylene. The reactor was stirred at 1000 rpm, heated to 77° C. (pressure of approximately 520 psig (3.58 MPa)), and held for the indicated reaction time before venting and recovering the polypropylene resin.

For Method A1 (hydrogen addition at beginning), the metallocene compound, FSCA, and TIBA were charged to a syringe and slurried in hexanes. The catalyst system slurry was charged to the 1-gallon reactor under a nitrogen stream. The reactor was sealed and charged with 2.5 L of liquid propylene, followed by the designated amount of hydrogen. The reactor was stirred at 1000 rpm, heated to 77° C. (pressure of approximately 520 psig (3.58 MPa)), and held for the indicated reaction time before venting and recovering the polypropylene resin.

For Method B2 (continuous hydrogen addition), the metallocene compound, FSCA, and TIBA were charged to a syringe and slurried in hexanes. The catalyst system slurry was charged to the 1-gallon reactor under a nitrogen stream. The reactor was sealed and charged with 2.5 L of liquid propylene, followed by the designated amount of hydrogen. The reactor was stirred at 1000 rpm and heated to 77° C. (pressure of approximately 520 psig (3.58 MPa)). The designated amount of hydrogen was continuously fed to the reactor over the reaction time, after which the reactor was vented and the polypropylene resin was recovered.

For Method C3 (hydrogen addition at beginning, higher temperature), the metallocene compound, FSCA, and TIBA were charged to a syringe and slurried in hexanes. The catalyst system slurry was charged to the 1-gallon reactor under a nitrogen stream. The reactor was sealed, charged with 2.5 L of liquid propylene, and heated to 60° C. while stirring at 1000 rpm. The designated amount of hydrogen was fed to the reactor, and the reactor was then heated to 77° C. After the indicated reaction time, the reactor was vented and the polypropylene resin was recovered.

For Method D4 (hydrogen addition at beginning, higher temperature), the metallocene compound, FSCA, and TIBA were charged to a syringe and slurried in hexanes. The catalyst system slurry was charged to the 1-gallon reactor under a nitrogen stream. The reactor was sealed, charged with 2.5 L of liquid propylene, and heated to 65° C. while stirring at 1000 rpm. The designated amount of hydrogen was fed to the reactor, and the reactor was then heated to 77° C. After the indicated reaction time, the reactor was vented and the polypropylene resin was recovered.

For Method E5 (first charge, second continuous), the metallocene compound, FSCA, and TIBA were charged to a syringe and slurried in hexanes. The catalyst system slurry was charged to the 1-gallon reactor under a nitrogen stream. The reactor was sealed, charged with 2.5 L of liquid propylene, and heated to 60° C. while stirring at 1000 rpm. The first designated amount of hydrogen was fed to the reactor, and the reactor was then heated to 77° C. The second designated amount of hydrogen was continuously fed to the reactor over the reaction time, after which the reactor was vented and the polypropylene resin was recovered.

Examples 78-106 were performed in a 5-gallon reactor, but in a similar manner to Examples 1-77, and with hydrogen addition methods as described above for Examples 1-77. Table III summarizes the polymerization conditions used for Examples 78-106, with variations in the hydrogen addition method provided in the table as discussed above. Table II and Table IV summarize the catalyst performance (activity and productivity) and polymer properties of Examples 1-77 and Examples 78-106, respectively.

As shown by Examples 1-7 in Tables I-II, catalyst systems containing metallocene compounds B and C produced polymers with slightly broader MWDs (larger Mw/Mn ratios) than catalyst systems containing metallocene compounds D and E, which have alkenyl substituents. Examples 8-20 as compared to Examples 21-37 demonstrate the effect of adding hydrogen at elevated temperature. In general, there was no significant difference in MWD with metallocene compound B when hydrogen was added at 60° C. versus at ambient temperature.

Figure 2:
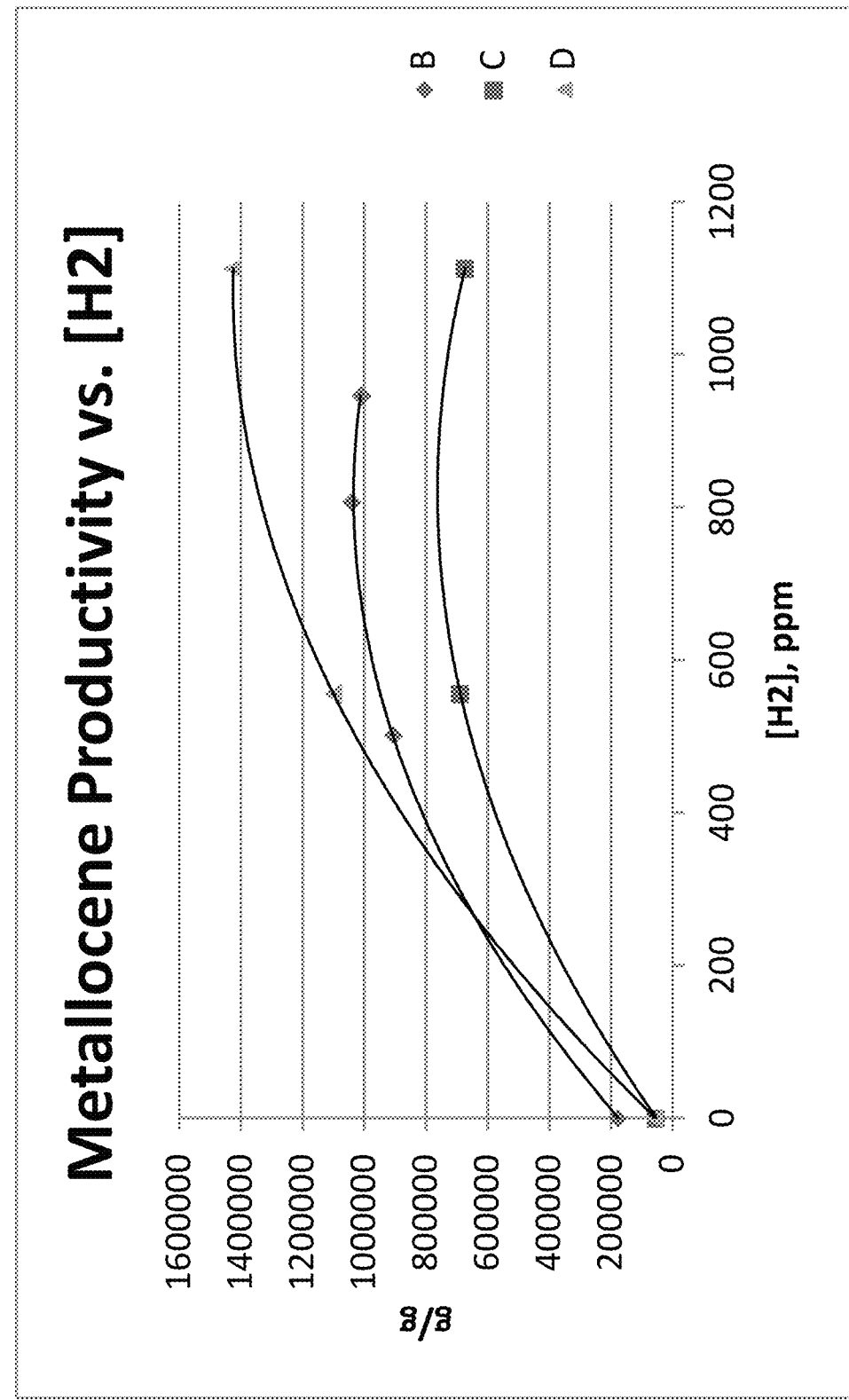
FIG. 2 presents a plot of catalyst productivity for metallocene compounds B, C, and D based on the amount of hydrogen present during polymerization.

Examples 21-55 demonstrate the unique and unexpected performance of metallocene compound D, with an alkenyl substituent on the bridging atom, as compared to a saturated analog (metallocene compound C) and a symmetric silyl bridging group (metallocene B). In the absence of hydrogen, the productivities of metallocene compounds C and D were nearly identical, and lower than that of metallocene compound B. However, as shown in FIG. 2, in the presence of hydrogen, metallocene compound D (with the alkenyl substituent as part of the silyl bridging group) was surprisingly more productive than metallocene compounds B and C. In addition, FIG. 2 illustrates the increased hydrogen response of metallocene compound D. In fact, it appears that with respect to productivity, metallocene compounds B and C have similar hydrogen responses (accounting for the productivity offset), while the response of metallocene compound D to hydrogen (different shape of curve) differs from either that of metallocene compounds B or C. FIG. 2 uses data from Examples 2, 5, 6, 23, 25, 26, 38, 39, 41, and 42, and the $H_2$ concentration is in molar ppm based on propylene.

Figure 3:
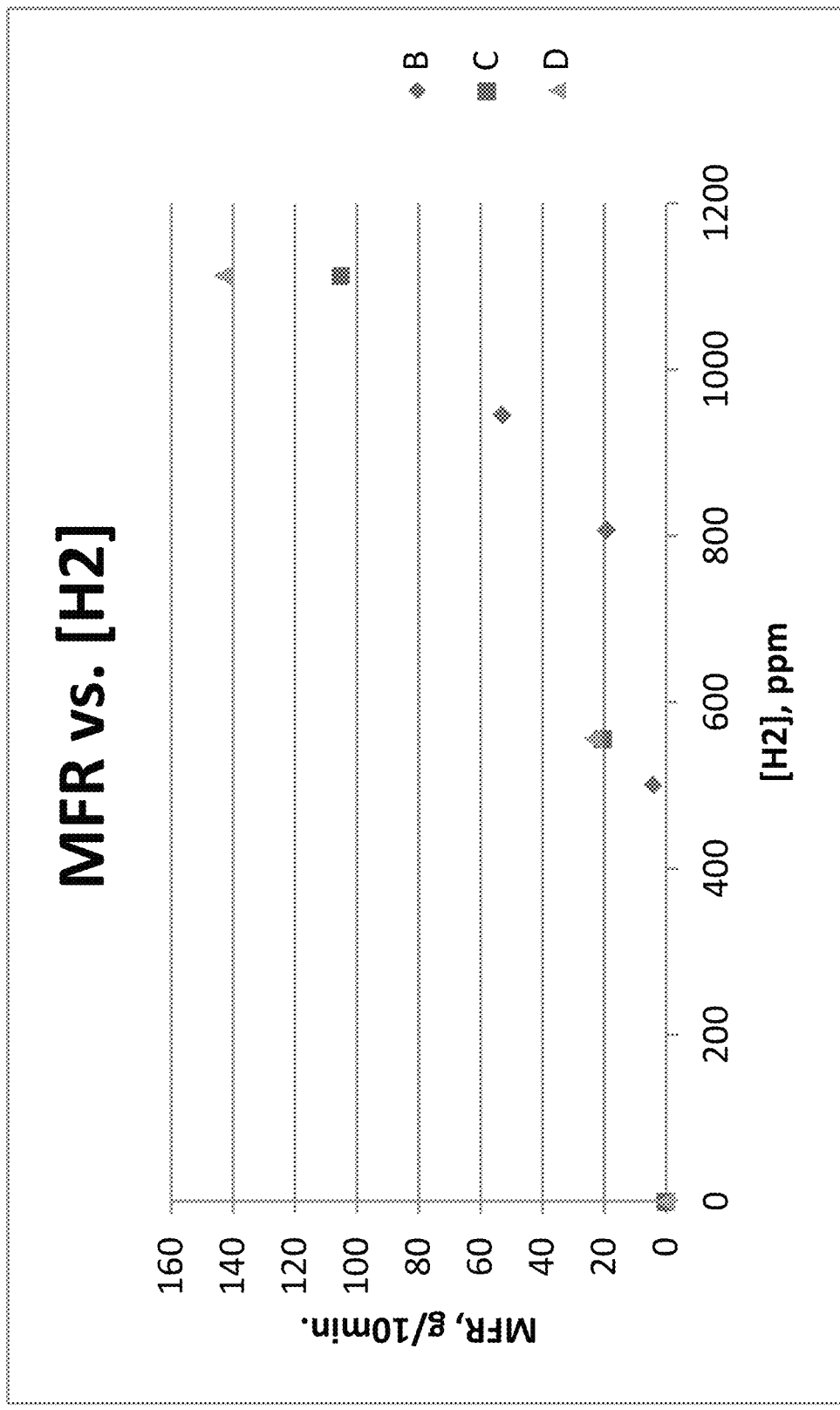
FIG. 3 presents a plot of the melt flow rates of polypropylenes produced using metallocene compounds B, C, or D based on the amount of hydrogen present during polymerization.

The melt flow rate (MFR) responses of metallocene compounds C and D were similar at low hydrogen concentration, as shown in FIG. 3. However, and beneficially, the melt flow rate response of metallocene compound D at increased hydrogen concentration was greater than that of metallocene compound C, indicating the unexpected impact of the alkenyl substituent on polypropylene molecular weight. Metallocene compound C trended more closely with metallocene compound B at high hydrogen concentration, while metallocene compound D exhibited a much stronger hydrogen response with respect to MFR. FIG. 3 uses data from Examples 2, 5, 6, 23, 25, 26, 38, 39, 41, and 42, and the $H_2$ concentration is in molar ppm based on propylene.

Figure 4:
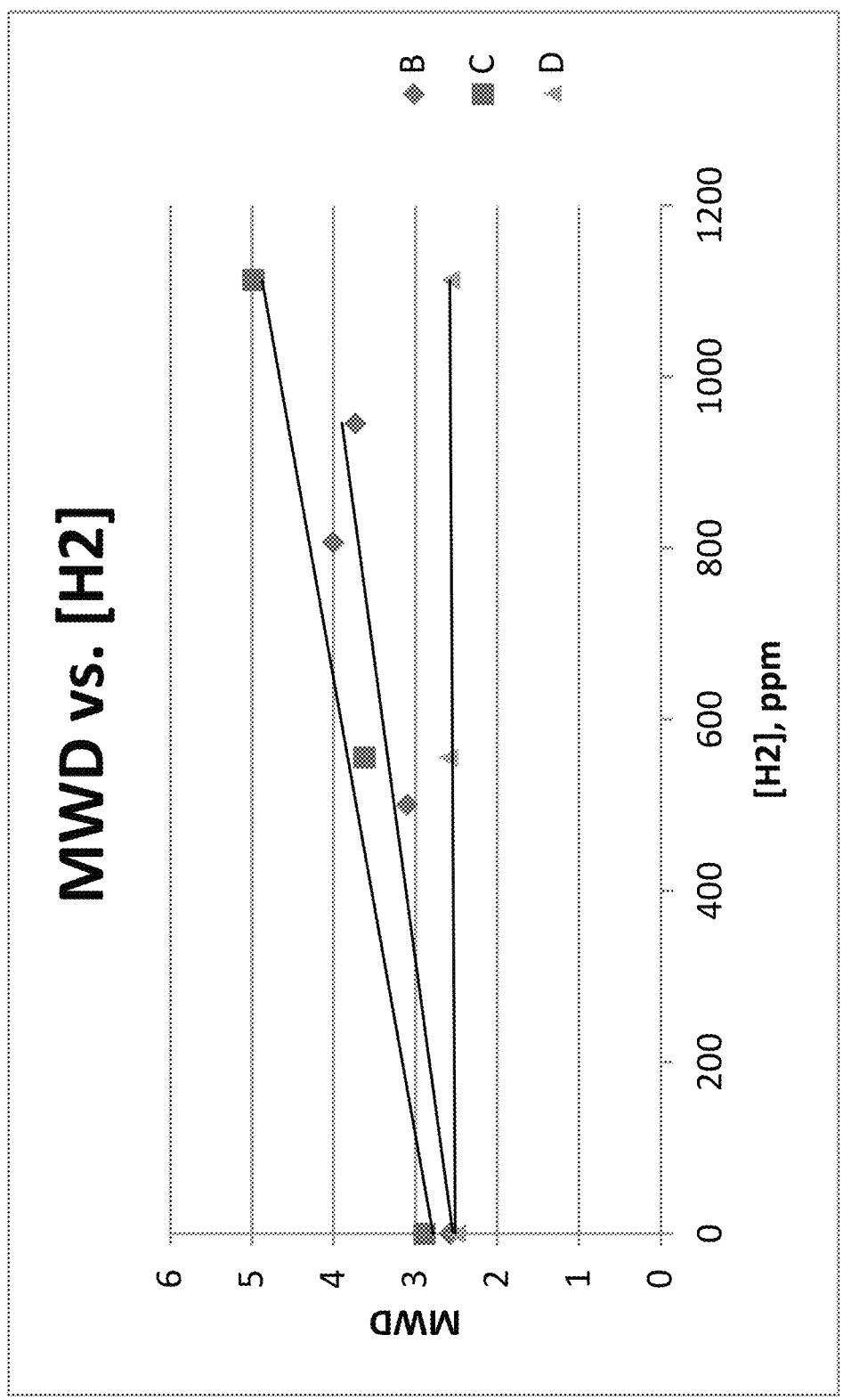
FIG. 4 presents a plot of the molecular weight distributions (MWDs, ratios of Mw/Mn) of polypropylenes produced using metallocene compounds B, C, or D based on the amount of hydrogen present during polymerization.

FIG. 4 demonstrates the narrower MWDs of polypropylenes produced using metallocene compound D (versus metallocene compounds B and C), as well as the surprisingly flat impact of the hydrogen concentration on the MWD. FIG. 4 uses data from Example 2, 5, 6, 23, 25, 26, 38, 39, 41, and 42, and the $H_2$ concentration is in molar ppm based on propylene.

Examples 56-64 in Tables I-II utilized a single front end drop of hydrogen at elevated temperature (60° C.). Generally, these examples demonstrate that the productivity of the alkenyl-containing metallocene compounds was superior to that of the other metallocenes, and that the alkenyl-containing metallocene compounds resulted in narrower MWDs. Examples 65-72 were similar to those of Examples 56-64, except that the hydrogen addition temperature was increased to 65° C. The results were very similar, except that the MWD narrowing was less significant for the alkenyl-containing metallocene compound. Examples 73-77 attempted to offset hydrogen consumption during the polymerization and to maintain constant hydrogen concentration: an initial hydrogen charge was added at 60° C., and a constant hydrogen feed was maintained through remainder of run. As above, the MWDs of polypropylenes produced using alkenyl-substituted metallocene compounds were significantly lower than polypropylene produced with the other metallocene compounds, despite the more constant hydrogen concentrations.

Examples 78-106 in Tables III-IV produced low molecular weight polypropylenes, and similar to the other examples, the MWDs of polypropylenes produced using alkenyl-substituted metallocene compounds were typically lower than polypropylenes produced with the other metallocene compounds.

Tables I-IV demonstrate that polypropylene homopolymers with melt flow rates ranging from 200 g/10 min to 3000 g/10 min, ratios of Mw/Mn ranging from 2 to 5, and ratios of Mz/Mw ranging from 1.7 to 3.5 can be produced using a variety of catalyst systems and under a variety of polymerization reaction conditions. Moreover, the catalyst systems had unexpectedly high metallocene catalyst activities (grams of polymer per gram of metallocene per hour, g/g/hr) and catalyst productivities (grams of polymer per gram of metallocene, g/g): generally from 500,000 g/g/hr to almost 4,000,000 g/g/hr, and generally from 250,000 g/g to over 2,000,000 g/g. Likewise, the catalyst systems had unexpectedly high catalyst activities based on the activator-support (grams of polymer per gram of activator-support per hour, g/g/hr) and catalyst productivities (grams of polymer per gram of activator-support, g/g): generally from 2,000 g/g/hr to almost 20,000 g/g/hr, and generally from 1,000 g/g to over 10,000 g/g.

Due to the high catalyst activities and catalyst productivities, the resulting polypropylene homopolymer can have very low levels of catalyst residue. For instance, the zirconium content (in parts per billion, ppb, by weight) in Examples 100-106 was calculated by multiplying the μmol Zr charged to the reactor times the molar mass of Zr times 1000, and then dividing by the grams of polymer produced in each example (see metallocene productivity values in Table IV). Thus, for Example 100, 1 mg of metallocene E was used, corresponding to 1.3 μmol of zirconium, and therefore (1.3*91.22*1000)/1652 results in approximately 72 ppb of zirconium in the polypropylene homopolymer of Example 100. For the polypropylene homopolymers of Examples 100-106, the ppb zirconium contents ranged from 58 ppb to 108 ppb.

Table V summarizes the polymer properties for Examples 107-108. Example 107 was a commercially-available polypropylene homopolymer resin from Exxon having a nominal MFR of 1500 g/10 min, while Example 108 was a commercially-available polypropylene homopolymer resin from Lyondell/Basell having a nominal MFR of 1200 g/10 min. Table VI compares the DSC peak melting points for representative polypropylene homopolymers of this invention with those of comparative Examples 107-108. Unexpectedly, the polypropylene homopolymers disclosed herein had surprisingly lower peak melting points, ranging from 139° C. to 150° C. Despite the lower melting points, the polypropylene homopolymers disclosed herein had similar isotactic contents ([mm], % isotactic at the triad level) to those of Examples 107-108, as shown in Table VII.

TABLE I

Examples 1-77 - Polymerization reaction conditions.

| Example | Metallocene | Metallocene (μmol) | FSCA (mg) | TIBA (mmol) | $H_2$ addition method | Initial $H_2$ drop (mg) | Initial $H_2$ drop (psi) | Metered $H_2$ drop (mg) | Metered $H_2$ drop (psi) | Total $H_2$ (mg) | Total $H_2$ (ppm, μmol/mol) | Time (hr) |
|---|---|---|---|---|---|---|---|---|---|---|---|---|
| 1 | B | 0.4 | 50 | 0.5 | N | 0 | 0 | 0 | 0 | 0 | 0 | 0.5 |
| 2 | B | 0.4 | 100 | 0.5 | N | 0 | 0 | 0 | 0 | 0 | 0 | 0.5 |
| 3 | B | 0.4 | 150 | 0.5 | N | 0 | 0 | 0 | 0 | 0 | 0 | 0.5 |
| 4 | B | 0.4 | 200 | 0.5 | N | 0 | 0 | 0 | 0 | 0 | 0 | 0.5 |
| 5 | C | 0.37 | 50 | 0.5 | N | 0 | 0 | 0 | 0 | 0 | 0 | 0.5 |
| 6 | D | 0.37 | 50 | 0.5 | N | 0 | 0 | 0 | 0 | 0 | 0 | 0.5 |
| 7 | E | 0.32 | 50 | 0.5 | N | 0 | 0 | 0 | 0 | 0 | 0 | 0.5 |
| 8 | B | 0.4 | 125 | 0.5 | A1 | 34 | 20 | NA | NA | 34 | 556 | 0.5 |
| 9 | B | 0.4 | 125 | 0.5 | A1 | 34 | 20 | NA | NA | 34 | 556 | 0.5 |
| 10 | B | 0.4 | 125 | 0.5 | A1 | 67 | 40 | NA | NA | 67 | 1113 | 0.5 |
| 11 | B | 0.4 | 100 | 0.5 | A1 | 101 | 60 | NA | NA | 101 | 1669 | 0.5 |
| 12 | B | 0.4 | 100 | 0.5 | A1 | 135 | 80 | NA | NA | 135 | 2226 | 0.5 |
| 13 | B | 0.4 | 100 | 0.5 | A1 | 135 | 80 | NA | NA | 135 | 2226 | 0.5 |
| 14 | B | 0.4 | 100 | 0.5 | A1 | 168 | 100 | NA | NA | 168 | 2782 | 0.5 |
| 15 | B | 0.4 | 100 | 0.5 | A1 | 34 | 20 | NA | NA | 34 | 556 | 0.5 |
| 16 | B | 0.4 | 100 | 0.5 | A1 | 168 | 100 | NA | NA | 168 | 2782 | 0.5 |
| 17 | B | 0.8 | 100 | 0.5 | A1 | 34 | 20 | NA | NA | 34 | 556 | 0.5 |
| 18 | B | 0.8 | 100 | 0.5 | A1 | 34 | 20 | NA | NA | 34 | 556 | 0.5 |
| 19 | B | 0.8 | 100 | 0.5 | A1 | 34 | 20 | NA | NA | 34 | 556 | 0.5 |
| 20 | B | 0.8 | 100 | 0.5 | A1 | 34 | 20 | NA | NA | 34 | 556 | 0.5 |
| 21 | B | 0.8 | 50 | 0.5 | B2 | 17 | 10 | 0 | 0 | 17 | 278 | 0.5 |
| 22 | B | 0.4 | 50 | 0.5 | B2 | 34 | 20 | 0 | 0 | 34 | 556 | 0.5 |
| 23 | B | 0.4 | 50 | 0.5 | B2 | 17 | 10 | 13 | 8 | 30 | 501 | 0.5 |
| 24 | B | 0.4 | 50 | 0.5 | B2 | 17 | 10 | 34 | 20 | 50 | 835 | 0.5 |
| 25 | B | 0.4 | 50 | 0.5 | B2 | 17 | 10 | 32 | 19 | 49 | 807 | 0.5 |
| 26 | B | 0.4 | 50 | 0.5 | B2 | 17 | 10 | 40 | 24 | 57 | 946 | 0.5 |
| 27 | B | 0.4 | 50 | 0.5 | B2 | 34 | 20 | 13 | 8 | 47 | 779 | 0.5 |
| 28 | B | 0.4 | 50 | 0.5 | B2 | 34 | 20 | 27 | 16 | 61 | 1002 | 0.5 |
| 29 | B | 0.4 | 50 | 0.5 | B2 | 50 | 30 | 17 | 10 | 67 | 1113 | 0.5 |
| 30 | B | 0.4 | 50 | 0.5 | B2 | 50 | 30 | 15 | 9 | 66 | 1085 | 0.5 |
| 31 | B | 0.4 | 50 | 0.5 | B2 | 50 | 30 | 32 | 19 | 82 | 1363 | 0.5 |
| 32 | B | 0.4 | 50 | 0.5 | B2 | 67 | 40 | 17 | 10 | 84 | 1391 | 0.5 |
| 33 | B | 0.4 | 50 | 0.5 | B2 | 67 | 40 | 30 | 18 | 98 | 1614 | 0.5 |
| 34 | B | 0.4 | 50 | 0.5 | B2 | 50 | 30 | 13 | 8 | 64 | 1057 | 0.5 |
| 35 | B | 0.4 | 50 | 0.5 | B2 | 67 | 40 | 50 | 30 | 118 | 1947 | 0.5 |
| 36 | B | 0.4 | 50 | 0.5 | B2 | 50 | 30 | 34 | 20 | 84 | 1391 | 0.5 |
| 37 | B | 0.4 | 50 | 0.5 | B2 | 50 | 30 | 0 | 0 | 50 | 835 | 0.5 |

TABLE I-continued

Examples 1-77 - Polymerization reaction conditions.

| Example | Metallocene | Metallocene (μmol) | FSCA (mg) | TIBA (mmol) | H₂ addition method | Initial H₂ drop (mg) | Initial H₂ drop (psi) | Metered H₂ drop (mg) | Metered H₂ drop (psi) | Total H₂ (mg) | Total H₂ (ppm, μmol/mol) | Time (hr) |
|---|---|---|---|---|---|---|---|---|---|---|---|---|
| 38 | C | 0.37 | 50 | 0.5 | B2 | 17 | 10 | 17 | 10 | 34 | 556 | 0.5 |
| 39 | C | 0.37 | 50 | 0.5 | B2 | 17 | 10 | 50 | 30 | 67 | 1113 | 0.5 |
| 40 | C | 0.37 | 50 | 0.5 | B2 | 17 | 10 | 50 | 30 | 67 | 1113 | 1 |
| 41 | D | 0.37 | 50 | 0.5 | B2 | 17 | 10 | 17 | 10 | 34 | 556 | 0.5 |
| 42 | D | 0.37 | 50 | 0.5 | B2 | 17 | 10 | 45 | 27 | 62 | 1029 | 0.5 |
| 43 | D | 0.22 | 30 | 0.4 | B2 | 34 | 20 | 17 | 10 | 50 | 835 | 0.5 |
| 44 | D | 0.22 | 30 | 0.4 | B2 | 34 | 20 | 27 | 16 | 61 | 1002 | 0.5 |
| 45 | D | 0.22 | 30 | 0.4 | B2 | 34 | 20 | 62 | 37 | 96 | 1586 | 0.5 |
| 46 | D | 0.22 | 30 | 0.4 | B2 | 50 | 30 | 17 | 10 | 67 | 1113 | 0.5 |
| 47 | D | 0.22 | 30 | 0.4 | B2 | 50 | 30 | 34 | 20 | 84 | 1391 | 0.5 |
| 48 | D | 0.22 | 30 | 0.4 | B2 | 67 | 40 | 17 | 10 | 84 | 1391 | 0.5 |
| 49 | D | 0.22 | 30 | 0.4 | B2 | 67 | 40 | 17 | 10 | 84 | 1391 | 0.5 |
| 50 | D | 0.22 | 30 | 0.4 | B2 | 50 | 30 | 27 | 16 | 77 | 1280 | 0.5 |
| 51 | D | 0.22 | 30 | 0.4 | B2 | 50 | 30 | 32 | 19 | 82 | 1363 | 0.5 |
| 52 | D | 0.22 | 30 | 0.4 | B2 | 67 | 40 | 34 | 20 | 101 | 1669 | 0.5 |
| 53 | D | 0.22 | 30 | 0.4 | B2 | 67 | 40 | 50 | 30 | 118 | 1947 | 0.5 |
| 54 | D | 0.22 | 30 | 0.4 | B2 | 50 | 30 | 64 | 38 | 114 | 1892 | 1 |
| 55 | D | 0.22 | 30 | 0.4 | B2 | 50 | 30 | 34 | 20 | 84 | 1391 | 1 |
| 56 | B | 0.4 | 50 | 0.5 | C3 | 34 | 20 | NA | NA | 34 | 556 | 0.5 |
| 57 | C | 0.37 | 50 | 0.5 | C3 | 34 | 20 | NA | NA | 34 | 556 | 0.5 |
| 58 | D | 0.37 | 50 | 0.5 | C3 | 34 | 20 | NA | NA | 34 | 556 | 0.5 |
| 59 | E | 0.32 | 50 | 0.5 | C3 | 17 | 10 | NA | NA | 17 | 278 | 0.5 |
| 60 | E | 0.32 | 50 | 0.5 | C3 | 34 | 20 | NA | NA | 34 | 556 | 0.5 |
| 61 | E | 0.32 | 100 | 0.5 | C3 | 34 | 20 | NA | NA | 34 | 556 | 0.5 |
| 62 | E | 0.19 | 30 | 0.5 | C3 | 50 | 30 | NA | NA | 50 | 835 | 0.5 |
| 63 | E | 0.19 | 30 | 0.5 | C3 | 67 | 40 | NA | NA | 67 | 1113 | 0.5 |
| 64 | E | 0.19 | 30 | 0.5 | C3 | 67 | 40 | NA | NA | 67 | 1113 | 0.5 |
| 65 | B | 0.4 | 50 | 0.5 | D4 | 67 | 40 | 67 | NA | 67 | 1113 | 0.5 |
| 66 | B | 0.4 | 50 | 0.5 | D4 | 34 | 20 | 34 | NA | 34 | 556 | 1 |
| 67 | C | 0.37 | 50 | 0.5 | D4 | 34 | 20 | 34 | NA | 34 | 556 | 0.5 |
| 68 | C | 0.37 | 50 | 0.5 | D4 | 67 | 40 | 67 | NA | 67 | 1113 | 0.5 |
| 69 | C | 0.37 | 50 | 0.5 | D4 | 34 | 20 | 34 | NA | 34 | 556 | 1 |
| 70 | D | 0.37 | 50 | 0.5 | D4 | 34 | 20 | 34 | NA | 34 | 556 | 0.5 |
| 71 | D | 0.37 | 50 | 0.5 | D4 | 67 | 40 | 67 | NA | 67 | 1113 | 0.5 |
| 72 | D | 0.37 | 50 | 0.5 | D4 | 34 | 20 | 34 | NA | 34 | 556 | 1 |
| 73 | B | 0.24 | 30 | 0.4 | E5 | 50 | 30 | 34 | 20 | 84 | 1391 | 1 |
| 74 | D | 0.22 | 30 | 0.4 | E5 | 50 | 30 | 34 | 20 | 84 | 1391 | 1 |
| 75 | E | 0.19 | 30 | 0.5 | E5 | 34 | 20 | 32 | 19 | 66 | 1085 | 0.5 |
| 76 | E | 0.19 | 30 | 0.5 | E5 | 34 | 20 | 27 | 16 | 61 | 1002 | 1 |
| 77 | E | 0.19 | 30 | 0.5 | E5 | 50 | 30 | 32 | 19 | 82 | 1363 | 1 |

TABLE II

Examples 1-77 - Polymer properties and catalyst performance.

| Example | Metallocene Productivity (g/g) | Metallocene Activity (g/g/hr) | Support productivity (g/g) | Support Activity (g/g/hr) | MFR (g/10 min) | Mn (kg/mol) | Mw (kg/mol) | Mz (kg/mol) | Mw/Mn | Mz/Mw | Tm (° C.) |
|---|---|---|---|---|---|---|---|---|---|---|---|
| 1 | 124,000 | 248,000 | 620 | 1,240 | 0 | 346 | 912 | 1719 | 2.6 | 1.9 | |
| 2 | 176,000 | 352,000 | 440 | 880 | 0 | 345 | 885 | 1661 | 2.6 | 1.9 | |
| 3 | 184,000 | 368,000 | 307 | 614 | 0 | 333 | 857 | 1631 | 2.6 | 1.9 | |
| 4 | 180,000 | 360,000 | 225 | 450 | | 325 | 833 | 1526 | 2.6 | 1.8 | |
| 5 | 52,000 | 104,000 | 260 | 520 | 0 | 323 | 933 | 1823 | 2.9 | 2.0 | |
| 6 | 56,000 | 112,000 | 280 | 560 | 0 | 289 | 722 | 1373 | 2.5 | 1.9 | |
| 7 | 48,000 | 96,000 | 240 | 480 | 0 | 347 | 843 | 1628 | 2.4 | 1.9 | |
| 8 | 1,084,000 | 2,168,000 | 2,168 | 4,336 | 19 | 63 | 206 | 377 | 3.3 | 1.8 | |
| 9 | 784,000 | 1,568,000 | 1,568 | 3,136 | 15 | 66 | 219 | 405 | 3.3 | 1.8 | |
| 10 | 884,000 | 1,768,000 | 1,768 | 3,536 | 277 | 27 | 101 | 204 | 3.7 | 2.0 | |
| 11 | 1,036,000 | 2,072,000 | 2,590 | 5,180 | 200 | 25 | 105 | 217 | 4.2 | 2.1 | |
| 12 | 180,000 | 360,000 | 450 | 900 | | | | | | | |
| 13 | 1,132,000 | 2,264,000 | 2,830 | 5,660 | 1557 | 13 | 54 | 131 | 4.2 | 2.4 | 148.2 |
| 14 | 880,000 | 1,760,000 | 2,200 | 4,400 | 1686 | 12 | 50 | 121 | 4.3 | 2.4 | |
| 15 | 780,000 | 1,560,000 | 1,950 | 3,900 | 40 | 63 | 198 | 364 | 3.1 | 1.8 | |
| 16 | 952,000 | 1,904,000 | 2,380 | 4,760 | 960 | 6 | 62 | 462 | 10.1 | 7.5 | |
| 17 | 452,000 | 904,000 | 2,260 | 4,520 | 27 | | | | | | |
| 18 | 838,000 | 1,676,000 | 4,190 | 8,380 | | 72 | 239 | 434 | 3.3 | 1.8 | |
| 19 | 110,000 | 220,000 | 550 | 1,100 | 20 | 32 | 222 | 549 | 6.9 | 2.5 | |
| 20 | 712,000 | 1,424,000 | 3,560 | 7,120 | 13 | 57 | 218 | 405 | 3.8 | 1.9 | |
| 21 | 636,000 | 1,272,000 | 6,360 | 12,720 | 5 | | | | | | |
| 22 | 652,000 | 1,304,000 | 3,260 | 6,520 | 32 | 54 | 178 | 327 | 3.3 | 1.8 | |

TABLE II-continued

Examples 1-77 - Polymer properties and catalyst performance.

| Example | Metallocene Productivity (g/g) | Metallocene Activity (g/g/hr) | Support productivity (g/g) | Support Activity (g/g/hr) | MFR (g/10 min) | Mn (kg/mol) | Mw (kg/mol) | Mz (kg/mol) | Mw/Mn | Mz/Mw | Tm (° C.) |
|---|---|---|---|---|---|---|---|---|---|---|---|
| 23 | 904,000 | 1,808,000 | 4,520 | 9,040 | 4 | 89 | 275 | 496 | 3.1 | 1.8 | 149.3 |
| 24 | 904,000 | 1,808,000 | 4,520 | 9,040 | 21 | 52 | 188 | 369 | 3.6 | 2.0 | |
| 25 | 1,040,000 | 2,080,000 | 5,200 | 10,400 | 19 | 50 | 200 | 422 | 4.0 | 2.1 | |
| 26 | 1,008,000 | 2,016,000 | 5,040 | 10,080 | 53 | 42 | 156 | 311 | 3.7 | 2.0 | |
| 27 | 748,000 | 1,496,000 | 3,740 | 7,480 | 22 | 53 | 185 | 347 | 3.5 | 1.9 | |
| 28 | 1,060,000 | 2,120,000 | 5,300 | 10,600 | 53 | 44 | 152 | 296 | 3.5 | 1.9 | |
| 29 | 556,000 | 1,112,000 | 2,780 | 5,560 | 70 | 37 | 146 | 292 | 4.0 | 2.0 | |
| 30 | 532,000 | 1,064,000 | 2,660 | 5,320 | 442 | 25 | 103 | 228 | 4.2 | 2.2 | |
| 31 | 972,000 | 1,944,000 | 4,860 | 9,720 | 273 | 26 | 104 | 217 | 4.0 | 2.1 | |
| 32 | 1,084,000 | 2,168,000 | 5,420 | 10,840 | 397 | 25 | 96 | 197 | 3.9 | 2.1 | |
| 33 | 996,000 | 1,992,000 | 4,980 | 9,960 | 377 | 23 | 94 | 198 | 4.1 | 2.1 | |
| 34 | 844,000 | 1,688,000 | 4,220 | 8,440 | 100 | 34 | 125 | 242 | 3.7 | 1.9 | |
| 35 | 844,000 | 1,688,000 | 4,220 | 8,440 | | 18 | 71 | 160 | 4.0 | 2.2 | |
| 36 | 752,000 | 1,504,000 | 3,760 | 7,520 | 298 | 27 | 93 | 189 | 3.5 | 2.0 | |
| 37 | 852,000 | 1,704,000 | 4,260 | 8,520 | 180 | 25 | 102 | 203 | 4.1 | 2.0 | |
| 38 | 688,000 | 1,376,000 | 3,440 | 6,880 | 20 | 52 | 187 | 364 | 3.6 | 1.9 | |
| 39 | 672,000 | 1,344,000 | 3,360 | 6,720 | 105 | 27 | 134 | 317 | 5.0 | 2.4 | |
| 40 | 584,000 | 584,000 | 2,920 | 2,920 | 73 | 28 | 141 | 356 | 5.1 | 2.5 | |
| 41 | 1,100,000 | 2,200,000 | 5,500 | 11,000 | 24 | 69 | 179 | 323 | 2.6 | 1.8 | |
| 42 | 1,424,000 | 2,848,000 | 7,120 | 14,240 | 143 | 45 | 114 | 230 | 2.6 | 2.0 | |
| 43 | 1,413,333 | 2,826,667 | 7,067 | 14,133 | 100 | 47 | 116 | 213 | 2.5 | 1.8 | |
| 44 | 1,406,667 | 2,813,333 | 7,033 | 14,067 | 98 | 45 | 121 | 234 | 2.7 | 1.9 | |
| 45 | 1,873,333 | 3,746,667 | 9,367 | 18,733 | 482 | 29 | 81 | 168 | 2.8 | 2.1 | |
| 46 | 1,140,000 | 2,280,000 | 5,700 | 11,400 | 359 | 34 | 87 | 169 | 2.5 | 1.9 | |
| 47 | 1,146,667 | 2,293,333 | 5,733 | 11,467 | 1063 | 23 | 63 | 123 | 2.8 | 1.9 | |
| 48 | 740,000 | 1,480,000 | 3,700 | 7,400 | | 26 | 72 | 139 | 2.8 | 1.9 | |
| 49 | 1,666,667 | 3,333,333 | 8,333 | 16,667 | 465 | 28 | 78 | 149 | 2.7 | 1.9 | |
| 50 | 1,000,000 | 2,000,000 | 5,000 | 10,000 | 760 | 26 | 74 | 153 | 2.9 | 2.1 | |
| 51 | 1,413,333 | 2,826,667 | 7,067 | 14,133 | 895 | 27 | 68 | 129 | 2.5 | 1.9 | |
| 52 | 1,066,667 | 2,133,333 | 5,333 | 10,667 | 2049 | 20 | 55 | 112 | 2.8 | 2.0 | |
| 53 | 1,153,333 | 2,306,667 | 5,767 | 11,533 | 3600 | 15 | 42 | 86 | 2.9 | 2.0 | |
| 54 | 1,946,667 | 1,946,667 | 9,733 | 9,733 | 696 | 20 | 70 | 153 | 3.5 | 2.2 | |
| 55 | 1,573,333 | 1,573,333 | 7,867 | 7,867 | 1442 | 20 | 61 | 127 | 3.1 | 2.1 | 146.1 |
| 56 | 476,000 | 952,000 | 2,380 | 4,760 | 34 | 47 | 168 | 331 | 3.6 | 2.0 | |
| 57 | 720,000 | 1,440,000 | 3,600 | 7,200 | 25 | 56 | 180 | 333 | 3.2 | 1.8 | |
| 58 | 964,000 | 1,928,000 | 4,820 | 9,640 | 113 | 43 | 123 | 239 | 2.9 | 1.9 | |
| 59 | 764,000 | 1,528,000 | 3,820 | 7,640 | 9 | 94 | 265 | 505 | 2.8 | 1.9 | 148.8 |
| 60 | 1,228,000 | 2,456,000 | 6,140 | 12,280 | 83 | 47 | 138 | 273 | 2.9 | 2.0 | |
| 61 | 1,636,000 | 3,272,000 | 4,090 | 8,180 | 16 | 69 | 212 | 413 | 3.1 | 1.9 | |
| 62 | 1,153,333 | 2,306,667 | 5,767 | 11,533 | 776 | 26 | 79 | 170 | 3.1 | 2.2 | |
| 63 | 1,233,333 | 2,466,667 | 6,167 | 12,333 | 1447 | 21 | 64 | 135 | 3.1 | 2.1 | 148.8 |
| 64 | 1,626,667 | 3,253,333 | 8,133 | 16,267 | 1433 | 19 | 60 | 131 | 3.1 | 2.2 | |
| 65 | 1,032,000 | 2,064,000 | 5,160 | 10,320 | 533 | 22 | 82 | 177 | 3.7 | 2.2 | |
| 66 | 1,632,000 | 1,632,000 | 8,160 | 8,160 | 12 | 71 | 224 | 402 | 3.1 | 1.8 | |
| 67 | 756,000 | 1,512,000 | 3,780 | 7,560 | 41 | 48 | 158 | 297 | 3.3 | 1.9 | |
| 68 | 940,000 | 1,880,000 | 4,700 | 9,400 | 645 | 18 | 76 | 167 | 4.2 | 2.2 | 148.1 |
| 69 | 1,452,000 | 1,452,000 | 7,260 | 7,260 | 10 | 75 | 230 | 407 | 3.1 | 1.8 | |
| 70 | 1,064,000 | 2,128,000 | 5,320 | 10,640 | 218 | 36 | 109 | 215 | 3.0 | 2.0 | |
| 71 | 1,304,000 | 2,608,000 | 6,520 | 13,040 | | 16 | 59 | 133 | 3.7 | 2.3 | |
| 72 | 1,568,000 | 1,568,000 | 7,840 | 7,840 | 66 | 49 | 147 | 285 | 3.0 | 1.9 | |
| 73 | 1,146,667 | 1,146,667 | 5,733 | 5,733 | | 20 | 80 | 172 | 4.0 | 2.1 | |
| 74 | 2,193,333 | 2,193,333 | 10,967 | 10,967 | | 21 | 66 | 130 | 3.1 | 2.0 | |
| 75 | 1,260,000 | 2,520,000 | 6,300 | 12,600 | | 25 | 78 | 168 | 3.1 | 2.1 | 148.6 |
| 76 | 1,746,667 | 1,746,667 | 8,733 | 8,733 | | 23 | 75 | 159 | 3.2 | 2.1 | |
| 77 | 1,606,667 | 1,606,667 | 8,033 | 8,033 | | 18 | 56 | 126 | 3.1 | 2.2 | |

TABLE III

Examples 78-106 - Polymerization reaction conditions.

| Example | Metallocene | Metallocene (µmol) | FSCA (mg) | TIBA (mmol) | $H_2$ addition method | Initial $H_2$ drop (mg) | Initial $H_2$ drop (psi) | Metered $H_2$ drop (mg) | Metered $H_2$ drop (psi) | Total $H_2$ (mg) | Total $H_2$ (ppm, µmol/mol) | Time (hr) |
|---|---|---|---|---|---|---|---|---|---|---|---|---|
| 78 | A | 6.3 | 1200 | 1 | A1 | 0 | | NA | NA | 0 | 0 | 0.75 |
| 79 | A | 6.3 | 1200 | 2 | A1 | 0 | | NA | NA | 0 | 0 | 0.75 |
| 80 | A | 6.3 | 1200 | 2 | A1 | 1122 | | NA | NA | 1122 | 4116 | 0.75 |
| 81 | A | 6.3 | 1200 | 2 | A1 | 2243 | | NA | NA | 2243 | 8233 | 0.75 |
| 82 | A | 6.3 | 1200 | 2 | A1 | 1122 | | NA | NA | 1122 | 4116 | 0.75 |
| 83 | A | 6.3 | 1200 | 2 | A1 | 0 | | NA | NA | 0 | 0 | 0.75 |
| 84 | A | 6.3 | 1200 | 2 | A1 | 561 | | NA | NA | 561 | 2058 | 0.75 |

TABLE III-continued

Examples 78-106 - Polymerization reaction conditions.

| Example | Metallocene | Metallocene (μmol) | FSCA (mg) | TIBA (mmol) | H₂ addition method | Initial H₂ drop (mg) | Initial H₂ drop (psi) | Metered H₂ drop (mg) | Metered H₂ drop (psi) | Total H₂ (mg) | Total H₂ (ppm, μmol/mol) | Time (hr) |
|---|---|---|---|---|---|---|---|---|---|---|---|---|
| 85 | A | 6.3 | 1200 | 2 | A1 | 393 | | NA | NA | 393 | 1441 | 0.75 |
| 86 | A | 6.3 | 1200 | 2 | A1 | 449 | | NA | NA | 449 | 1647 | 0.75 |
| 87 | A | 6.3 | 1200 | 2 | A1 | 505 | | NA | NA | 505 | 1852 | 0.75 |
| 88 | A | 6.3 | 900 | 2 | A1 | 561 | | NA | NA | 561 | 2058 | 0.75 |
| 89 | A | 6.3 | 900 | 2 | A1 | 505 | | NA | NA | 505 | 1852 | 0.75 |
| 90 | A | 4.2 | 600 | 2 | A1 | 505 | | NA | NA | 505 | 1852 | 0.75 |
| 91 | A | 4.2 | 600 | 2 | | 505 | | NA | NA | 505 | 1852 | 0.75 |
| 92 | B | 3.2 | 800 | 2 | A1 | 393 | 70 | NA | NA | 393 | 1441 | 0.5 |
| 93 | B | 3.2 | 400 | 2 | A1 | 393 | 70 | NA | NA | 393 | 1441 | 0.5 |
| 94 | B | 2.4 | 300 | 1.5 | A1 | 449 | 80 | NA | NA | 449 | 1647 | 0.5 |
| 95 | B | 2.4 | 300 | 2 | A1 | 449 | 80 | NA | NA | 449 | 1647 | 0.5 |
| 96 | E | 1.9 | 300 | 1.5 | C3 | 280 | 50 | NA | NA | 280 | 1029 | 0.5 |
| 97 | E | 1.9 | 300 | 1.5 | C3 | 336 | 60 | NA | NA | 336 | 1235 | 0.5 |
| 98 | E | 1.3 | 200 | 1.5 | C3 | 336 | 60 | NA | NA | 336 | 1235 | 1 |
| 99 | E | 1.3 | 200 | 1.5 | C3 | 393 | 70 | NA | NA | 393 | 1441 | 0.5 |
| 100 | E | 1.3 | 200 | 1.5 | E5 | 336 | 60 | 84 | 15 | 421 | 1544 | 1 |
| 101 | E | 1.3 | 200 | 1.5 | E5 | 280 | 50 | 84 | 15 | 365 | 1338 | 1 |
| 102 | E | 1.3 | 200 | 1.5 | E5 | 280 | 50 | 140 | 25 | 421 | 1544 | 1 |
| 103 | E | 1.3 | 200 | 1.5 | E5 | 336 | 60 | 56 | 10 | 393 | 1441 | 1 |
| 104 | E | 1.3 | 200 | 1.5 | E5 | 336 | 60 | 112 | 20 | 449 | 1647 | 1 |
| 105 | E | 1.3 | 200 | 1.5 | E5 | 336 | 60 | 112 | 20 | 449 | 1647 | 1 |
| 106 | E | 1.3 | 200 | 1.5 | E5 | 308 | 55 | 140 | 25 | 449 | 1647 | 1 |

TABLE IV

Examples 78-106 - Polymer properties and catalyst performance.

| Example | Metallocene Productivity (g/g) | Metallocene Activity (g/g/hr) | Support productivity (g/g) | Support Activity (g/g/hr) | MFR (g/10 min) | Mn (kg/mol) | Mw (kg/mol) | Mz (kg/mol) | Mw/Mn | Mz/Mw | Tm (° C.) |
|---|---|---|---|---|---|---|---|---|---|---|---|
| 78 | 116,667 | 155,556 | 292 | 389 | 91 | 40 | 138 | 286 | 3.5 | 2.1 | |
| 79 | 435,667 | 580,889 | 1,089 | 1,452 | 28 | 42 | 132 | 256 | 3.2 | 1.9 | |
| 80 | 408,000 | 544,000 | 1,020 | 1,360 | 29 | 6 | 18 | 40 | 2.8 | 2.3 | |
| 81 | 778,667 | 1,038,222 | 1,947 | 2,596 | 16 | 4 | 13 | 46 | 3.4 | 3.5 | |
| 82 | 568,667 | 758,222 | 1,422 | 1,896 | | 6 | 19 | 58 | 3.2 | 3.1 | |
| 83 | 675,333 | 900,444 | 1,688 | 2,251 | 753 | NA | NA | NA | NA | NA | |
| 84 | 744,667 | 992,889 | 1,862 | 2,482 | 1618 | 16 | 60 | 167 | 3.8 | 2.8 | |
| 85 | 744,667 | 992,889 | 1,862 | 2,482 | 1435 | 19 | 62 | 143 | 3.3 | 2.3 | 142.0 |
| 86 | 652,000 | 869,333 | 1,630 | 2,173 | 3054 | 13 | 41 | 96 | 3.2 | 2.3 | 139.8 |
| 87 | 541,000 | 721,333 | 1,353 | 1,803 | 7001 | 13 | 39 | 85 | 3.0 | 2.2 | 140.9 |
| 88 | 721,000 | 961,333 | 2,403 | 3,204 | 3125 | 17 | 58 | 148 | 3.5 | 2.5 | 141.1 |
| 89 | 754,333 | 1,005,778 | 2,514 | 3,353 | 1415 | 17 | 65 | 172 | 3.8 | 2.6 | 140.9 |
| 90 | 751,500 | 1,002,000 | 2,505 | 3,340 | 4671 | 14 | 47 | 123 | 3.4 | 2.6 | 141.1 |
| 91 | 557,000 | 742,667 | 1,857 | 2,476 | | 12 | 38 | 90 | 3.3 | 2.4 | 141.8 |
| 92 | 1,315,000 | 2,630,000 | 3,288 | 6,575 | 82 | 34 | 156 | 427 | 4.6 | 2.7 | |
| 93 | 1,180,000 | 2,360,000 | 5,900 | 11,800 | 177 | 34 | 134 | 273 | 3.9 | 2.0 | |
| 94 | 760,000 | 1,520,000 | 3,800 | 7,600 | | 30 | 119 | 248 | 4.0 | 2.1 | |
| 95 | 562,000 | 1,124,000 | 2,810 | 5,620 | | 19 | 73 | 158 | 3.9 | 2.2 | |
| 96 | 1,111,333 | 2,222,667 | 5,557 | 11,113 | 646 | 26 | 76 | 150 | 2.9 | 2.0 | |
| 97 | 1,332,000 | 2,664,000 | 6,660 | 13,320 | 211 | 38 | 105 | 211 | 2.8 | 2.0 | |
| 98 | 2,051,000 | 2,051,000 | 10,255 | 10,255 | 443 | 29 | 88 | 181 | 2.8 | 2.0 | |
| 99 | 1,865,000 | 3,730,000 | 9,325 | 18,650 | | | | | | | |
| 100 | 1,652,000 | 1,652,000 | 8,260 | 8,260 | 1088 | 23 | 68 | 139 | 2.9 | 2.0 | |
| 101 | 1,783,000 | 1,783,000 | 8,915 | 8,915 | 838 | 25 | 75 | 160 | 3.0 | 2.1 | |
| 102 | 2,024,000 | 2,024,000 | 10,120 | 10,120 | 880 | 24 | 68 | 134 | 2.8 | 2.0 | |
| 103 | 2,013,000 | 2,013,000 | 10,065 | 10,065 | 792 | 24 | 76 | 164 | 3.1 | 2.2 | |
| 104 | 1,100,000 | 1,100,000 | 5,500 | 5,500 | 1517 | 21 | 62 | 130 | 2.9 | 2.1 | |
| 105 | 1,454,000 | 1,454,000 | 7,270 | 7,270 | | 20 | 58 | 114 | 2.9 | 2.0 | |
| 106 | 1,490,000 | 1,490,000 | 7,450 | 7,450 | 1674 | 18 | 56 | 119 | 3.1 | 2.1 | 148.6 |

TABLE V

Examples 107-108 - Polymer properties of comparative polypropylene homopolymers.

| Example | MFR (g/10 min) | Mn (kg/mol) | Mw (kg/mol) | Mz (kg/mol) | Mw/Mn | Mz/Mw | Tm (° C.) |
|---|---|---|---|---|---|---|---|
| 107 | 1500 | 26 | 60 | 102 | 2.3 | 1.7 | 152.3 |
| 108 | 1200 | 22 | 68 | 128 | 3.1 | 1.9 | 153.7 |

TABLE VI

DSC peak melting points.

| Example | MFR (g/10 min) | Tm (° C.) |
|---|---|---|
| 13 | 1557 | 148.2 |
| 23 | 4.1 | 149.3 |
| 55 | 1442 | 146.1 |
| 59 | 8.9 | 148.8 |

TABLE VI-continued

DSC peak melting points.

| Example | MFR (g/10 min) | Tm (° C.) |
|---|---|---|
| 63 | 1447 | 148.8 |
| 68 | 645 | 148.1 |
| 75 |  | 148.6 |
| 85 | 1435 | 142.0 |
| 86 | 3054 | 139.8 |
| 87 | 7001 | 140.9 |
| 88 | 3125 | 141.1 |
| 89 | 1415 | 140.9 |
| 90 | 4671 | 141.1 |
| 91 |  | 141.8 |
| 107 | 1500 | 152.3 |
| 108 | 1200 | 153.7 |

TABLE VII

Tacticity analysis.

| Example | Isotatic [mm] (%) | Syndiotactic [rr] (%) | Atactic [mr] (%) |
|---|---|---|---|
| 13 | 96.9 | 0.7 | 2.4 |
| 55 | 96.6 | 0.7 | 2.7 |
| 63 | 97.2 | 0.6 | 2.2 |
| 68 | 97.2 | 0.6 | 2.2 |
| 89 | 93.0 | 2.1 | 4.9 |
| 106 | 96.2 | 3.0 | 0.8 |
| 107 | 97.0 | 2.3 | 0.7 |
| 108 | 99.1 | 0.7 | 0.3 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1. A polypropylene homopolymer having a melt flow rate in a range from about 200 g/10 min to about 3000 g/10 min, a ratio of Mw/Mn in a range from about 2 to about 5, and a peak melting point in a range from about 138° C. to about 151° C.

Embodiment 2. A polypropylene homopolymer having a melt flow rate in a range from about 200 g/10 min to about 3000 g/10 min, a ratio of Mw/Mn in a range from about 2 to about 5, and a ratio of Mz/Mw in a range from about 1.7 to about 3.5.

Embodiment 3. The homopolymer defined in embodiment 1 or 2, wherein the homopolymer has a melt flow rate in any range disclosed herein, e.g., from about 300 g/10 min to about 2500 g/10 min, from about 350 g/10 min to about 2500 g/10 min, from about 500 g/10 min to about 2500 g/10 min, or from about 500 g/10 min to about 2000 g/10 min.

Embodiment 4. The homopolymer defined in any one of the preceding embodiments, wherein the homopolymer has a ratio of Mw/Mn in any range disclosed herein, e.g., from about 2.2 to about 5, from about 2.2 to about 4.5, from about 2.4 to about 5, or from about 2.4 to about 4.5.

Embodiment 5. The homopolymer defined in any one of the preceding embodiments, wherein the homopolymer has a ratio of Mz/Mw in any range disclosed herein, e.g., from about 1.7 to about 3, from about 1.8 to about 3.5, from about 1.8 to about 3, or from about 1.9 to about 2.8.

Embodiment 6. The homopolymer defined in any one of the preceding embodiments, wherein the homopolymer has a peak melting point in any range disclosed herein, e.g., from about 138° C. to about 152° C., from about 140° C. to about 150° C., or from about 141° C. to about 149° C.

Embodiment 7. The homopolymer defined in any one of the preceding embodiments, wherein the homopolymer has an isotacticity [mm] in any range disclosed herein, e.g., from about 93% to about 99%, from about 94% to about 98%, or from about 96% to about 98%.

Embodiment 8. The homopolymer defined in any one of the preceding embodiments, wherein the homopolymer has a Mw in any range disclosed herein, e.g., from about 40,000 g/mol to about 110,000 g/mol, from about 40,000 g/mol to about 90,000 g/mol, from about 45,000 g/mol to about 110,000 g/mol, or from about 45,000 g/mol to about 85,000 g/mol.

Embodiment 9. The homopolymer defined in any one of the preceding embodiments, wherein the homopolymer has a Mn in any range disclosed herein, e.g., from about 10,000 g/mol to about 40,000 g/mol, from about 10,000 g/mol to about 30,000 g/mol, from about 12,000 g/mol to about 35,000 g/mol, or from about 12,000 g/mol to about 28,000 g/mol.

Embodiment 10. The homopolymer defined in any one of the preceding embodiments, wherein the homopolymer has a Mz in any range disclosed herein, e.g., from about 80,000 g/mol to about 230,000 g/mol, from about 90,000 g/mol to about 200,000 g/mol, from about 90,000 g/mol to about 180,000 g/mol, or from about 100,000 g/mol to about 170,000 g/mol.

Embodiment 11. The homopolymer defined in any one of the preceding embodiments, wherein the homopolymer contains an amount of zirconium in any range disclosed herein, e.g., from about 10 ppb to about 150 ppb, from about 20 ppb to about 80 ppb, from about 30 ppb to about 75 ppb, or from about 25 ppb to about 60 ppb.

Embodiment 12. The homopolymer defined in any one of the preceding embodiments, wherein the homopolymer contains substantially no peroxide residue or peroxide decomposition by-products.

Embodiment 13. The homopolymer defined in any one of the preceding embodiments, wherein the homopolymer is a single reactor product, e.g., not a post-reactor blend of two polymers, for instance, having different molecular weight characteristics.

Embodiment 14. An article comprising the homopolymer defined in any one of embodiments 1-13.

Embodiment 15. An article comprising the homopolymer defined in any one of embodiments 1-13 and an additive.

Embodiment 16. The article defined in embodiment 14 or 15, wherein the article is a molded product, a nonwoven article, or a fiber or fabric.

Embodiment 17. A fiber or fabric or nonwoven article comprising the homopolymer defined in any one of embodiments 1-13.

Embodiment 18. A fiber or fabric or nonwoven article comprising the homopolymer defined in any one of embodiments 1-13 and an additive.

Embodiment 19. The article or fiber or fabric defined in any one of embodiments 15-16 or 18, wherein the additive comprises an antioxidant, acid scavenger, antiblock additive, slip additive, colorant, filler, processing aid, UV inhibitor, or any combination thereof.

Embodiment 20. A method of making a fiber (e.g., meltblown or spunbond) comprising a polypropylene homopolymer, the method comprising:

(i) providing a polypropylene homopolymer defined in any one of embodiments 1-13; and (ii) melt processing the polypropylene homopolymer through a fiber die to form the fiber.

Embodiment 21. The method defined in embodiment 20, wherein the method comprises melt processing the homopolymer and at least one additive through the die.

Embodiment 22. The method defined in embodiment 21, wherein the additive comprises an antioxidant, acid scavenger, antiblock additive, slip additive, colorant, filler, processing aid, UV inhibitor, or any combination thereof.

Embodiment 23. A fiber formed by the method defined in any one of embodiments 20-22.

Embodiment 24. The fiber or method defined in any one of embodiments 17-23, wherein the fiber has a diameter/thickness in any range disclosed herein, e.g., from about 0.1 microns to about 20 microns, from about 0.5 microns to about 15 microns, from about 1 micron to about 12 microns, or from about 2 microns to about 10 microns.

Embodiment 25. A catalyst composition comprising any racemic ansa-bis(indenyl)zirconocene compound disclosed herein, any activator-support disclosed herein, and optionally, any co-catalyst disclosed herein.

Embodiment 26. The composition defined in embodiment 25, wherein the metallocene compound comprises a silicon, carbon, or germanium bridging atom.

Embodiment 27. The composition defined in embodiment 25 or 26, wherein the indenyl groups are substituted indenyl groups, e.g., with any suitable substituent, any suitable number of substituents, and any suitable position that conforms to rules of chemical valence.

Embodiment 28. The composition defined in any one of embodiments 25-27, wherein the indenyl groups have a phenyl or substituted phenyl substituent.

Embodiment 29. The composition defined in any one of embodiments 25-28, wherein the metallocene compound comprises an alkenyl substituent, e.g., on the indenyl groups or as part of the bridging group.

Embodiment 30. The composition defined in embodiment 25, wherein the metallocene compound has formula (A):

$$\text{rac-E(InR}_n)_2\text{ZrX}_2 \qquad (A);$$

wherein In is an indenyl group, each X independently is any monoanionic ligand disclosed herein, each R independently is any substituent disclosed herein, n is any integer from 0 to 6 (inclusive), and E is any bridging group disclosed herein.

Embodiment 31. The composition defined in embodiment 30, wherein E is a bridging group of the formula $>E^4R^1R^2$, wherein $E^4$ is a carbon, silicon, or germanium atom, and $R^1$ and $R^2$ independently are any substituent disclosed herein, e.g., H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group; or H or a hydrocarbyl group having up to 18 carbon atoms.

Embodiment 32. The composition defined in embodiment 31, wherein at least one of $R^1$ and $R^2$ is a phenyl group.

Embodiment 33. The composition defined in embodiment 31, wherein at least one of $R^1$ and $R^2$ is an alkyl group (e.g., a $C_1$ to $C_8$ alkyl group).

Embodiment 34. The composition defined in embodiment 31, wherein at least one of $R^1$ and $R^2$ is an alkenyl group (e.g., a $C_3$ to $C_8$ terminal alkenyl group).

Embodiment 35. The composition defined in any one of embodiments 30-34, wherein each R independently is any substituent disclosed herein, e.g., H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group; or H or a hydrocarbyl group having up to 18 carbon atoms.

Embodiment 36. The composition defined in any one of embodiments 30-35, wherein n is equal to 1 or 2.

Embodiment 37. The composition defined in any one of embodiments 30-35, wherein n is equal to 0.

Embodiment 38. The composition defined in any one of embodiments 30-35, wherein n is equal to 2, and one R is an alkyl or alkenyl group, and the other R is a phenyl or alkyl-substituted phenyl group.

Embodiment 39. The composition defined in any one of embodiments 30-38, wherein each X independently is H, $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $OBR^Z_2$, or $OSO_2R^Z$, wherein $R^Z$ is a $C_1$ to $C_{36}$ hydrocarbyl group.

Embodiment 40. The composition defined in any one of embodiments 30-38, wherein each X independently is any halide or $C_1$ to $C_{18}$ hydrocarbyl group disclosed herein.

Embodiment 41. The composition defined in any one of embodiments 30-38, wherein each X is Cl.

Embodiment 42. The composition defined in any one of embodiments 25-41, wherein the activator-support comprises any solid oxide treated with any electron-withdrawing anion disclosed herein.

Embodiment 43. The composition defined in any one of embodiments 25-41, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Embodiment 44. The composition defined in any one of embodiments 25-41, wherein the activator-support comprises fluorided alumina, sulfated alumina, fluorided silica-alumina, sulfated silica-alumina, fluorided silica-coated alumina, fluorided-chlorided silica-coated alumina, sulfated silica-coated alumina, or any combination thereof.

Embodiment 45. The composition defined in any one of embodiments 25-41, wherein the activator-support comprises a fluorided solid oxide, a sulfated solid oxide, or a combination thereof.

Embodiment 46. The composition defined in any one of embodiments 25-45, wherein the activator-support further comprises any metal or metal ion disclosed herein, e.g., zinc, nickel, vanadium, titanium, silver, copper, gallium, tin, tungsten, molybdenum, zirconium, or any combination thereof.

Embodiment 47. The composition defined in any one of embodiments 25-46, wherein the catalyst composition comprises a co-catalyst, e.g., any co-catalyst disclosed herein.

Embodiment 48. The composition defined in any one of embodiments 25-47, wherein the co-catalyst comprises any organoaluminum compound disclosed herein.

Embodiment 49. The composition defined in embodiment 48, wherein the organoaluminum compound comprises trimethylaluminum, triethylaluminum, triisobutylaluminum, or a combination thereof.

Embodiment 50. The composition defined in any one of embodiments 25-49, wherein the catalyst composition is substantially free of aluminoxane compounds, organoboron or organoborate compounds, ionizing ionic compounds, or combinations thereof.

Embodiment 51. The composition defined in any one of embodiments 25-50, wherein the catalyst composition is produced by a process comprising contacting, in any order, the metallocene compound, the activator-support, and the co-catalyst.

Embodiment 52. The composition defined in any one of embodiments 25-51, wherein a catalyst activity (or a catalyst productivity) of the catalyst composition is in any range disclosed herein, e.g., at least about 1,000 grams, at least about 2,000 grams, at least about 3,500 grams, or at least about 5,000 grams, and often up to about 10,000 grams, up to about 15,000 grams, up to about 20,000 grams, or up to about 25,000 grams of polypropylene homopolymer per gram of activator-support per hour (or grams of polypropylene homopolymer per gram of activator-support), under bulk polymerization conditions, with a triisobutylaluminum co-catalyst, a polymerization temperature of 77° C. and a reactor pressure of 520 psig (3.58 MPa).

Embodiment 53. The composition defined in any one of embodiments 25-52, wherein a catalyst activity (or a catalyst productivity) of the catalyst composition is in any range disclosed herein, e.g., at least about 250,000 grams, at least about 500,000 grams, at least about 1,000,000 grams, or at least about 1,500,000 grams, and often up to about 2,000,000 grams, up to about 3,000,000 grams, up to about 4,000,000 grams, or up to about 5,000,000 grams of polypropylene homopolymer per gram of metallocene compound per hour (or grams of polypropylene homopolymer per gram of metallocene compound), under bulk polymerization conditions, with a triisobutylaluminum co-catalyst, a polymerization temperature of 77° C. and a reactor pressure of 520 psig (3.58 MPa).

Embodiment 54. The composition defined in any one of embodiments 25-53, wherein the metallocene compound comprises an alkenyl substituent, and a catalyst activity (or a catalyst productivity) of the catalyst composition is greater than that of a catalyst composition containing a similar metallocene compound without the alkenyl substituent, under the same polymerization conditions (bulk polymerization conditions, with a triisobutylaluminum co-catalyst, 600 molar ppm of $H_2$, a polymerization temperature of 77° C. and a reactor pressure of 520 psig (3.58 MPa)) and using the same catalyst preparation conditions and catalyst components (other than the metallocene compound).

Embodiment 55. A polymerization process, the process comprising contacting the catalyst composition defined in any one of embodiments 25-54 with propylene in a polymerization reactor system under polymerization conditions to produce a polypropylene homopolymer.

Embodiment 56. The process defined in embodiment 55, wherein the polymerization reactor system comprises a batch reactor, a slurry reactor, a gas-phase reactor, a solution reactor, a high pressure reactor, a tubular reactor, an autoclave reactor, or a combination thereof.

Embodiment 57. The process defined in embodiment 55, wherein the polymerization reactor system comprises a slurry reactor, a gas-phase reactor, a solution reactor, or a combination thereof.

Embodiment 58. The process defined in embodiment 55, wherein the polymerization reactor system comprises a loop slurry reactor.

Embodiment 59. The process defined in any one of embodiments 55-58, wherein the polymerization reactor system comprises a single reactor.

Embodiment 60. The process defined in any one of embodiments 55-58, wherein the polymerization reactor system comprises 2 reactors.

Embodiment 61. The process defined in any one of embodiments 55-58, wherein the polymerization reactor system comprises more than 2 reactors.

Embodiment 62. The process defined in any one of embodiments 55-61, wherein the polymerization conditions comprise a polymerization reaction temperature in a range from about 25° C. to about 175° C. and a reaction pressure in a range from about 200 psig to about 1000 psig (about 1.4 MPa to about 6.9 MPa).

Embodiment 63. The process defined in any one of embodiments 55-62, wherein the polymerization conditions are substantially constant, e.g., for a particular polymer grade.

Embodiment 64. The process defined in any one of embodiments 55-63, wherein no hydrogen is added to the polymerization reactor system.

Embodiment 65. The process defined in any one of embodiments 55-63, wherein hydrogen is added to the polymerization reactor system.

Embodiment 66. The process defined in embodiment 65, wherein the MFR of the polypropylene homopolymer increases by from about 200% to about 1000%, based on an increase in molar $H_2$ concentration (based on propylene) from 600 ppm to 1100 ppm.

Embodiment 67. The process defined in embodiment 65 or 66, wherein the ratio of Mw/Mn is substantially constant (e.g., within +/−25%) over a range of from 600 ppm to 1000 molar ppm $H_2$, i.e., a flat or substantially constant Mw/Mn with increasing hydrogen concentration.

Embodiment 68. The process defined in any one of embodiments 65-67, wherein the metallocene compound comprises an alkenyl substituent, and the Mw/Mn of the polypropylene homopolymer produced by the process is less than that of a homopolymer obtained using a similar metallocene compound without the alkenyl substituent, under the same polymerization conditions, using the same catalyst preparation conditions and catalyst components (other than the metallocene compound).

Embodiment 69. The process defined in any one of embodiments 65-68, wherein the process is conducted in the presence of a molar amount of $H_2$, based on propylene, in any range disclosed herein, e.g., from about 200 ppm to about 2000 ppm, or from about 300 ppm to about 1500 ppm $H_2$.

Embodiment 70. The process defined in any one of embodiments 55-69, wherein the process does not include a vis-breaking step.

Embodiment 71. The process defined in any one of embodiments 55-70, wherein the polypropylene homopolymer produced is defined in any one of embodiments 1-13.

Embodiment 72. A polypropylene homopolymer produced by the process defined in any one of embodiments 55-70.

Embodiment 73. A polypropylene homopolymer defined in any one of embodiments 1-13 produced by the process defined in any one of embodiments 55-70.

Embodiment 74. An article (e.g., a fiber) comprising the homopolymer defined in any one of embodiments 72-73.

We claim:

1. A polymerization process, the process comprising contacting a catalyst composition with propylene in a polymerization reactor system under polymerization conditions to produce a polypropylene homopolymer, wherein the catalyst composition comprises a racemic ansa-bis(indenyl)zirconocene compound, an activator-support, and an optional co-catalyst; and wherein the zirconocene compound comprises an alkenyl substituent, and a catalyst activity of the catalyst composition is at least 10% greater than that of a catalyst composition containing a similar zirconocene compound without the alkenyl substituent, under bulk polymerization conditions, with a triisobutylaluminum co-catalyst, 600 molar ppm of $H_2$, a polymerization temperature of 77° C. and a reactor pressure of 520 psig (3.58 MPa).

2. The process of claim 1, wherein the polymerization reactor system comprises a slurry reactor, gas-phase reactor, solution reactor, or a combination thereof.

3. The process of claim 1, wherein:
the polymerization reactor system comprises a loop slurry reactor; and
the catalyst composition comprises an organoaluminum co-catalyst.

4. The process of claim 1, wherein:
a melt flow rate of the polypropylene homopolymer increases by from about 200% to about 1000%, based on an increase in molar $H_2$ concentration, based on propylene, from 600 ppm to 1100 ppm; or
a ratio of Mw/Mn of the polypropylene homopolymer is substantially constant over a range of from 600 molar ppm $H_2$ to 1000 molar ppm $H_2$, based on propylene; or both.

5. A polymerization process, the process comprising contacting a catalyst composition with propylene in a polymerization reactor system under polymerization conditions to produce a polypropylene homopolymer, wherein the catalyst composition comprises a racemic ansa-bis(indenyl)zirconocene compound, an activator-support, and an optional co-catalyst; and
wherein the zirconocene compound comprises an alkenyl substituent, and a ratio of Mw/Mn of the polypropylene homopolymer produced by the process is less than that of a homopolymer obtained using a similar zirconocene compound without the alkenyl substituent, under the same catalyst preparation and polymerization conditions.

6. The process of claim 1, wherein the zirconocene compound has formula (A):

  (A); wherein:

In is an indenyl group;
each X independently is a monoanionic ligand;
each R independently is H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group;
n is an integer from 0 to 6, inclusive;
E is a bridging group of the formula $>E^4R^1R^2$, wherein $E^4$ is a carbon, silicon, or germanium atom, and $R^1$ and $R^2$ independently are H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group; and
at least one of $R^1$ and $R^2$ is the alkenyl substituent.

7. The process of claim 6, wherein:
each X independently is a halide or $C_1$ to $C_{18}$ hydrocarbyl group;
each R independently is H or a $C_1$ to $C_{18}$ hydrocarbyl group;
n is equal to 0, 1, or 2;
$E^4$ is a carbon or silicon atom;

$R^1$ and $R^2$ independently are a phenyl group, a $C_1$ to $C_8$ alkyl group, or a $C_3$ to $C_8$ terminal alkenyl group, wherein at least one of $R^1$ and $R^2$ is the $C_3$ and $C_8$ terminal alkenyl group;

the activator-support comprises a fluorided solid oxide, a sulfated solid oxide, or a combination thereof; and
the catalyst composition comprises an organoaluminum co-catalyst.

8. The process of claim 7, wherein:
each X is Cl;
$E^4$ is a silicon atom; and
$R^1$ and $R^2$ independently are a $C_1$ to $C_8$ alkyl group or a $C_3$ to $C_8$ terminal alkenyl group, wherein at least one of $R^1$ and $R^2$ is the $C_3$ to $C_8$ terminal alkenyl group.

9. The process of claim 1, wherein a catalyst activity of the catalyst composition is at least about 2,000 grams of polypropylene homopolymer per gram of activator-support per hour, under bulk polymerization conditions, with a triisobutylaluminum co-catalyst, a polymerization temperature of 77° C. and a reactor pressure of 520 psig (3.58 MPa).

10. The process of claim 1, wherein a catalyst activity of the catalyst composition is at least about 1,000,000 grams of polypropylene homopolymer per gram of zirconocene compound per hour, under bulk polymerization conditions, with a triisobutylaluminum co-catalyst, a polymerization temperature of 77° C. and a reactor pressure of 520 psig (3.58 MPa).

11. The process of claim 1, wherein the catalyst composition is substantially free of aluminoxane compounds, organoboron or organoborate compounds, ionizing ionic compounds, or combinations thereof.

12. The process of claim 1, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

13. The process of claim 12, wherein the catalyst composition comprises an organoaluminum co-catalyst.

14. The process of claim 1, wherein the process is conducted in the presence of about 200 ppm to about 2000 ppm moles of $H_2$, based on moles of propylene.

15. The process of claim 1, wherein the polypropylene homopolymer has a melt flow rate from about 200 g/10 min to about 3000 g/10 min.

16. The process of claim 15, wherein the process does not include a vis-breaking step.

17. The process of claim 1, wherein the polypropylene homopolymer contains from about 10 ppb to about 150 ppb of zirconium.

18. The process of claim 1, wherein:
the polymerization reactor system comprises a loop slurry reactor;
the catalyst composition comprises an organoaluminum co-catalyst; and the activator-support comprises sulfated alumina, fluorided silica-alumina, fluorided silica-coated alumina, or a combination thereof.

19. The process of claim 18, wherein the organoaluminum co-catalyst comprises trimethylaluminum, triethylaluminum, triisobutylaluminum, or a combination thereof.

* * * * *